(12) United States Patent
Nemoto et al.

(10) Patent No.: US 8,728,626 B2
(45) Date of Patent: May 20, 2014

(54) METHOD FOR FORMING COATING FILM AND COATED ARTICLE

(75) Inventors: Yukihiro Nemoto, Hiratsuka (JP); Eiji Kuwano, Hiratsuka (JP); Shigeo Nishiguchi, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 1189 days.

(21) Appl. No.: 12/591,638

(22) Filed: Nov. 25, 2009

(65) Prior Publication Data

US 2010/0129659 A1 May 27, 2010

(30) Foreign Application Priority Data

Nov. 26, 2008 (JP) ................................. 2008-300555

(51) Int. Cl.
*B32B 27/00* (2006.01)
(52) U.S. Cl.
USPC .......................... 428/504; 427/407.1; 427/410
(58) Field of Classification Search
USPC .................. 427/407.1–419.8; 428/411.1–704
See application file for complete search history.

(56) References Cited

U.S. PATENT DOCUMENTS

| | | | |
|---|---|---|---|
| 6,734,260 B2* | 5/2004 | Nishiguchi et al. | ........... 525/405 |
| 2003/0106804 A1 | 6/2003 | Nishiguchi et al. | |
| 2005/0161330 A1* | 7/2005 | Toi et al. | ........ 204/484 |
| 2007/0023288 A1 | 2/2007 | Kuwano et al. | |
| 2008/0287612 A1 | 11/2008 | Nishiguchi et al. | |
| 2009/0069510 A1 | 3/2009 | Nishiguchi et al. | |

FOREIGN PATENT DOCUMENTS

| | | |
|---|---|---|
| CN | 1754928 | 4/2006 |
| CN | 101307200 | 11/2008 |
| CN | 101386768 | 3/2009 |
| JP | 3-181369 | 8/1991 |
| JP | 2001-252613 | 9/2001 |
| JP | 2002-224613 | 8/2002 |
| JP | 2002-224614 | 8/2002 |
| JP | 2002-282773 | 10/2002 |
| JP | 2005-238222 | 9/2005 |
| JP | 2006-167681 | 6/2006 |
| JP | 2007-61812 | 3/2007 |

OTHER PUBLICATIONS

Chinese Office Action issued Jan. 6, 2012 in corresponding Chinese Application No. 200910223259.1, with English translation thereof.

* cited by examiner

*Primary Examiner* — William Phillip Fletcher, III
(74) *Attorney, Agent, or Firm* — Wenderoth, Lind & Ponack, L.L.P.

(57) ABSTRACT

The present invention provides a coated product having excellent corrosion resistance and excellent finish by a 3-coat 1-bake method;
the method including the steps of forming cured coating film (A1) comprising cationic electrodeposition coating composition (A) on a metal object to be coated; forming first colored coated film (B1) by coating first colored aqueous coating composition (B); forming second colored coated film (C1) by coating second colored aqueous coating composition (C) on uncured first colored coated film (B1); forming clear coated film (D1) by coating clear coating composition (D) on uncured second colored coated film (C1); and simultaneously curing uncured first colored coated film (B1), uncured second colored coated film (C1), and uncured clear coated film (D1).

7 Claims, No Drawings

METHOD FOR FORMING COATING FILM AND COATED ARTICLE

TECHNICAL FIELD

The present invention relates to a method for forming a coating film to obtain a multilayer coating film having excellent finish by a 3-coat 1-bake method, wherein a first colored aqueous coating composition, a second colored aqueous coating composition, and a clear coating composition are coated on a specific electrodeposition cured coating film, and the three layers of uncured coating films are simultaneously dried by heating.

BACKGROUND ART

Usually, when coating molded metal products such as automobile bodies, metal parts for motorcycles, household electric appliances, and steel furniture, an electrodeposition coating composition is first applied and baked; an intermediate coating composition is applied to the baked electrodeposition coating film and baked; a colored aqueous coating composition is applied; preheating is performed; and then a clear coating composition is applied and baked, forming a multilayer coating film (a coating film formation method utilizing a so-called "3C2B process"). By such baking, uneven coating films are smoothed, and a multilayer coating film with excellent corrosion resistance and excellent finish can be obtained.

However, when baking is performed after application of each coating composition, not only is a great energy cost needed for baking, but immense labor and expenditure are also needed for operation and maintenance of the baking facilities. Further, for the purpose of reducing low-volatile organic compounds in coating compositions (VOC reduction), organic solvent-based coating compositions have been shifted to aqueous coating compositions.

For the purposes of energy-saving, omission of processes, and VOC reduction, a multilayer coating film with excellent corrosion resistance and excellent finish obtained by a coating film formation method (hereinafter, may be abbreviated as an "aqueous 3C1B process") in which a first colored aqueous coating composition, a second colored aqueous coating composition, and a clear coating composition are sequentially applied to an electrodeposition coating film, and the three layers are simultaneously cured by heating, is desired.

Conventionally, for improving finish in a 3-coat 1-bake process, Patent Document 1, for example, discloses a method for forming a high-quality multilayer coating film utilizing a 3-coat 1-bake process, in which: an organic solvent-based coating composition (referred to as a non-aqueous dispersion coating composition in the specification) is used as at least one of an intermediate coating composition, a top coat base coating composition, and a top coat clear coating composition; and, before baking, these coating compositions are sequentially applied to a laser-textured dull steel plate that has been undercoated by cationic electrodeposition coating, followed by baking. However, the method has a problem in that, in order to form a high-quality three-layer coating film in a single baking, a molded product formed from a costly laser-textured dull steel plate must be used to ensure the desired finish in the vertical section and horizontal section.

Patent Document 2 discloses a method for forming a multilayer coating film, in which: electrodeposition coating composition (A) is applied to an object to be coated; the coating film is cured by heating; and intermediate coating composition (B), top coat base coating composition (C), and clear coating composition (D) are applied wet-on-wet, and heated to simultaneously cure the three coating films. In the method, a cationic electrodeposition coating composition that contains: a resin (a) obtained by reacting a cyclic ester compound with hydroxyl in a bisphenol epoxy resin; vinyl resin (b) having a solubility parameter value of less than 9.6; polyalkylene glycol (c) having a solubility parameter value of less than 9.6; and pigment component (d) whose average particle diameter is adjusted to be not greater than 0.5 µm, is used as electrodeposition coating composition (A). However, intermediate coating composition (B) and top coat base coating composition (C), which are used in the multilayer coating film formation method, are organic solvent-based coating compositions, and are not aqueous coating compositions that can achieve VOC reduction.

Patent Document 3 discloses a multilayer coating film formation method in which: a cationic electrodeposition coating composition is applied to a base material to form a cured electrodeposition coating film with a glass transition temperature of not less than 110° C. and a surface roughness (Ra) of not greater than 0.3 µm; an intermediate coating composition, a top coat base coating composition, and a top coat clear coating composition are sequentially applied to the surface of the electrodeposition coating film to form three coating films, namely, an uncured intermediate coating film, an uncured top coat base coating film, and an uncured top coat clear coating film; and the three coating films are simultaneously cured by heating. However, when only the glass transition temperature and the surface roughness (Ra) of the cured coating film of the cationic electrodeposition coating composition are regulated, a multilayer coating film formed on the cationic electrodeposition coating film through an aqueous 3C1B process could not achieve both the desired corrosion resistance and the desired finish at the same time.

Patent Document 4 discloses a multilayer coating film formation method in which: a cationic electrodeposition coating composition is applied to a base material to form a cured electrodeposition coating film with an absorption rate of toluene, which is a nonpolar organic solvent, of not greater than 25%; an intermediate coating composition, a top coat base coating composition, and a top coat clear coating composition are sequentially applied to the surface of the cured electrodeposition coating film to form three coating films, namely, an uncured intermediate coating film, an uncured top coat base coating film, and an uncured top coat clear coating film; and the three coating films are simultaneously cured by heating. However, the multilayer coating film formation method of Patent Document 4 is intended to apply organic solvent-based coating compositions on an electrodeposition coating film in an overlapping manner.

Patent Document 5 discloses a coating film formation method that includes: a process of applying an aqueous intermediate coating composition to a cationic electrodeposition coating film to form an uncured aqueous intermediate coating film; a process of applying an aqueous base coating composition to the uncured aqueous intermediate coating film to form an uncured base coating film; a process of applying a clear coating composition to the uncured base coating film; and a process of simultaneously curing by heating the uncured aqueous intermediate coating film, the uncured aqueous base coating film, and the uncured clear coating film. In this method, the metal ion concentration and the amount of neutralizer in the cationic electrodeposition coating composition are specified.

However, during preheating or heat-drying the cationic electrodeposition coating film described in the Patent Document 5, the electrodeposition coating film swells, resulting in undulation and unevenness. When a multilayer coating film is formed through an aqueous 3C1B process, the multilayer coating film cannot achieve both the desired corrosion resistance and the desired finish at the same time due to the unevenness of the electrodeposition coating film.

Patent Document 6 discloses a multilayer coating film formation method in which: an intermediate coating composition, a top coat base coating composition, and a top coat clear coating composition are applied to a cured cationic electrodeposition coating film; and the uncured coating films of these coating compositions are simultaneously cured by baking. The cured electrodeposition coating film has a center line mean roughness (Ra) in a roughness curve of 0.05 to 0.25 µm, and a center line mean roughness (Pa) in a profile curve of 0.05 to 0.30

However, when only the center line mean roughness (Ra) in the roughness curve and the center line mean roughness (Pa) in the profile curve of the cured coating film of the cationic electrodeposition coating composition are defined to be 0.05 to 0.25 µm and 0.05 to 0.30 respectively, the desired corrosion resistance and the desired finish are not obtained through a 3-coat 1-bake process in which a first colored aqueous coating composition, a second colored aqueous coating composition, and a clear coating composition are applied to an electrodeposition coating film in an overlapping manner.

Patent Document 7 discloses a method for forming a multilayer coating film on an electrodeposition coating film through a 3-coat 1-bake process, wherein the electrodeposition coating film before curing by heating has an arithmetic average roughness (Ra) in a roughness curve of 0.3 to 4.0 µm. However, even when the arithmetic average roughness (Ra) in the roughness curve of the uncured electrodeposition coating film is defined, a multilayer coating film that is obtained through a 3-coat 1-bake process cannot achieve both the desired corrosion resistance and the desired finish at the same time, just as in the case of an electrodeposition coating film with a surface roughness (Ra) of not greater than 0.3 µm, which is described in Patent Document 3.

Patent Document 8 discloses a multilayer coating film formation method in which: first colored coating composition (B), second colored coating composition (C), and clear coating composition (D) are sequentially applied wet-on-wet on a cured coating film of electrodeposition coating composition (A) that has a loss on heating (X) of not greater than 5 weight %; and the obtained three coating films are simultaneously cured by heating. However, the correlation between the fact that the weight loss (eliminated component) of the electrodeposition coating film is small when the electrodeposition coating film is cured by heating, and the corrosion resistance and the finish of the multilayer coating film, is not clear.

CITATION LIST

Patent Literature

[PTL 1] Japanese Unexamined Patent Publication No. 1991-181369
[PTL 2] Japanese Unexamined Patent Publication No. 2001-252613
[PTL 3] Japanese Unexamined Patent Publication No. 2002-224613
[PTL 4] Japanese Unexamined Patent Publication No. 2002-224614
[PTL 5] Japanese Unexamined Patent Publication No. 2002-282773
[PTL 6] Japanese Unexamined Patent Publication No. 2005-238222
[PTL 7] Japanese Unexamined Patent Publication No. 2006-167681
[PTL 8] Japanese Unexamined Patent Publication No. 2007-61812

SUMMARY OF INVENTION

Technical Problem

An object of the present invention is to provide a method for forming a multilayer coating film having excellent finish and corrosion resistance on an electrodeposition coated film by an aqueous 3-coat 1-bake method (hereunder, this method may be referred to as an aqueous 3C1B process).

Solution to Problem

In the aqueous 3C1B process, a first colored aqueous coating composition is coated on an electrodeposition coated film, a second colored aqueous coating composition is coated on an uncured first colored aqueous coated film, and a clear coating composition is coated on an uncured second colored aqueous coated film. At this time, the uncured first colored aqueous coated film and the second colored aqueous coating composition contain an organic solvent with high polarity having no more than 11 carbon atoms (hereunder, this organic solvent may be referred to as "polar organic solvent(s) having no more than 11 carbon atoms") in order to prevent mixing of layers between the coating films and sagging; achieve leveling of the uncured coating films; etc. However, the resulting multilayer coating film after baking had an unsatisfactory finish.

Because an electrodeposition coating film has a high polarity, the degree of swelling of the electrodeposition coating film is increased if an organic solvent with a strong solubility contained in the first colored aqueous coating composition, the second colored aqueous coating composition or the clear coating composition is in contact with the electrodeposition coating film when the organic solvent becomes hot due to the preheating or baking step. In particular, in the formation of a coating film by the "aqueous 3C1B process", because coating films are recoated on a cured electrodeposition coating film without curing the first colored aqueous coating composition (intermediate coat) by baking, the amount of the organic solvent contained in the wet coating film that is in contact with the cured electrodeposition coating film inherently becomes large. Therefore, the electrodeposition coating film swells due to the permeating organic solvent, deteriorating the finish of the multilayer coating film formed on the electrodeposition coating film.

In contrast, known Patent Document 4 (Japanese Unexamined Patent Publication No. 2002-224614) discloses an invention, wherein the toluene absorption rate after dipping a cured electrodeposition coating film in toluene, which is a nonpolar organic solvent, at room temperature for one week is defined, and excellent finish of a multilayer coating film formed on an electrodeposition coating film having a low toluene absorption rate is attained. In other words, the invention of Patent Document 4 was not made on the assumption that the electrodeposition coating film comes in contact with a hot polar organic solvent by the first aqueous coating composition or the second aqueous coating composition being heated in a standard 3-coat 1-bake coating line.

The present inventors started from the premise that a polar organic solvent is heated and comes in contact with the electrodeposition coating film at a temperature preheating the first colored aqueous coating composition and the second colored aqueous coating composition (i.e., 70 to 120° C.), and at a temperature drying by heating the first colored aqueous coating composition, the second colored aqueous coating composition and the clear coating composition (i.e., 80 to 170° C.). Based on that premise, the present inventors found that the resistance to high-temperature solvent of the electrodeposition coating film, in particular to a polar organic solvent having no more than 11 carbon atoms, greatly affects the finish of the multilayer coating film formed on the electrodeposition coating film. The present inventors also found that in the formation of a multilayer coating film by the aqueous 3C1B process, an electrodeposition cured coating film that satisfies the following requirements achieves the object:

(i) a center line mean roughness (Ra) in a roughness curve (hereunder this may be referred to as a center line mean roughness (Ra)), (ii) a centre line average (Wca) in the filtered central line waviness curve (hereunder this may be referred to as "a centre line average (Wca)"), (iii) a solvent swelling ratio of not greater than 30.0 mass % after being immersed in any organic solvent selected from n-butyl alcohol, dipropylene glycol monobutyl ether, 2-ethyl-1-hexanol, 3-methoxybutyl acetate and diethylene glycol monoethyl ether maintained at 80° C. for 10 minutes.

The present invention has been accomplished based on the above findings.

Specifically, the present invention provides the methods and coated article as described below.

Item 1. A method for forming a coating film comprising the steps of:

forming cured coating film (A1) of cationic electrodeposition coating composition (A) on a metal object to be coated;

forming first colored coated film (B1) by coating first colored aqueous coating composition (B);

forming second colored coated film (C1) by coating second colored aqueous coating composition (C) on uncured first colored coated film (B1);

forming clear coated film (D1) by coating clear coating composition (D) on uncured second colored coated film (C1); and simultaneously curing uncured first colored coated film (B1), uncured second colored coated film (C1), and uncured clear coated film (D1), said cured coating film (A1) comprising cationic electrodeposition coating composition (A) having:

(i) a center line mean roughness (Ra) of not greater than 0.50 µm in a roughness curve at a cutoff value of 2.5 mm;

(ii) a centre line average (Wca) of not greater than 0.50 µm in the filtered central line waviness curve at a high-band cutoff value of 0.8 mm and a low-band cutoff value of 8 mm; and (iii) a solvent swelling ratio of not greater than 30.0 mass % after immersed in any organic solvent selected from n-butyl alcohol, dipropylene glycol monobutyl ether, 2-ethyl-1-hexanol, 3-methoxybutyl acetate and diethylene glycol monoethyl ether maintained at 80° C. for 10 minutes.

Item 2. The method for forming a coating film according to claim 1, wherein cationic electrodeposition coating composition (A) comprises amino group-containing modified epoxy resin (a1) modified with a xylene formaldehyde resin that is obtained by reacting epoxy resin (a11) having an epoxy equivalent of 180 to 2,500, phenolic hydroxyl group-containing xylene formaldehyde resin (a12), and amino group-containing compound (a13).

Item 3. 3. The method for forming a coating film according to Item 2, wherein cationic electrodeposition coating composition (A) further comprises, in addition to amino group-containing modified epoxy resin (a1), amino group-containing modified epoxy resin (a2), said amino group-containing modified epoxy resin (a2) is obtained by reacting amino group-containing compound (a24) with modified epoxy resin (I) that is obtainable by a reaction of diepoxy compound (a21), which is compound (a211) represented by formula (1) below or compound (a212) represented by formula (2) below, epoxy resin (a22) having an epoxy equivalent of 170 to 500, and bisphenol compound (a23),

[Chem. 1]

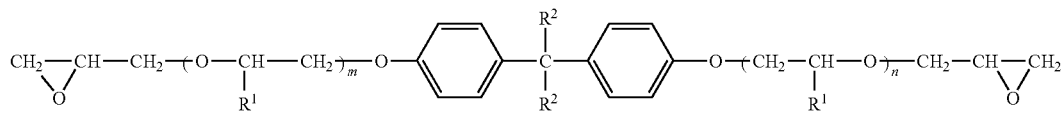

Formula (1)

wherein each $R^1$ may be the same or different and each represents a hydrogen atom or a $C_{1-6}$ alkyl group, $R^2$ may be the same or different and each represents a hydrogen atom or a $C_{1-2}$ alkyl group, and m and n, which represent the number of repeat units of the portion having an alkylene oxide structure, are integers where m+n=1 to 20,

[Chem. 2]

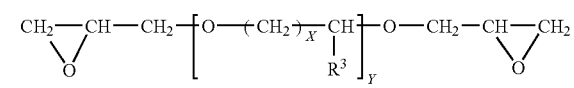

Formula (2)

wherein each $R^3$ may be the same or different, and each represents a hydrogen atom or a $C_{1-6}$ alkyl group, X is an integer of 1 to 9, Y is an integer of 1 to 50, and when Y is not less than 2, each $R^3$ in the repeating unit may be the same or different.

Item 4. The method for forming a coating film according to any one of Items 1 to 3, wherein cationic electrodeposition coating composition (A) comprises 30 to 60 parts by mass of amino group-containing modified epoxy resin (a1), 5 to 30 parts by mass of amino group-containing modified epoxy resin (a2), and 10 to 40 parts by mass of blocked polyisocyanate curing agent (b) relative to 100 parts by mass of the total solids components of (a1), (a2) and (b).

Item 5. The method for forming a coating film according to any one of Items 1 to 4, wherein an isocyanate compound contained in blocked polyisocyanate curing agent (b) is an alicyclic polyisocyanate compound and/or an aromatic polyisocyanate compound having an aromatic ring.

Item 6. The method for forming a coating film according to any one of Items 1 to 5, wherein first colored aqueous coating composition (B) is a coating composition that contains 1 to 150 parts by mass of polar organic solvent having no more than 11 carbon atoms relative to 100 parts by mass of the total of base resin and cross-linking agent.

Item 7. The method for forming a coating film according to any one of Items 1 to 6, wherein second colored aqueous coating composition (C) contains 1 to 150 parts by mass of polar organic solvent having no more than 11 carbon atoms relative to 100 parts by mass of the total of base resin and cross-linking agent.

Item 8. A coated article obtained by a method defined by any one of Items 1 to 7.

Advantageous Effects of Invention

1. The method for forming a coating film of the present invention provides a coated product having excellent finish and corrosion resistance. Furthermore, because the "aqueous 3C1B process" is employed, the present invention can reduce the energy consumption, the space required, and the amount of VOC emitted.

The above-described effects can be attained by using a cationic electrodeposition coating composition that satisfies the following criteria:
 (i) a center line mean roughness (Ra) in a roughness curve,
 (ii) a centre line average (Wca) in the filtered central line waviness curve, and
 (iii) a solvent swelling ratio of not greater than 30.0 mass % after being immersed in an organic solvent selected from n-butyl alcohol, dipropylene glycol monobutyl ether, 2-ethyl-1-hexanol, 3-methoxybutyl acetate or diethylene glycol monoethyl ether maintained at 80° C. for 10 minutes.

2. In particular, in a cured electrodeposition coating film comprising a cationic electrodeposition coating composition that comprises amino group-containing modified epoxy resin (a1), the xylene resin structure in amino group-containing modified epoxy resin (a1) can render plasticity and hydrophobicity to an epoxy resin skeleton; accordingly, the plasticity improves the smoothness of the electrodeposition coating film, and the hydrophobicity reduces the hot solvent swelling ratio against a hot solvent of the electrodeposition coating film.

3. By using amino group-containing modified epoxy resin (a2) together with amino group-containing modified epoxy resin (a1), the smoothness of the electrodeposition coating film can be further improved while maintaining the anti-swelling property against solvents of the electrodeposition coating film. This further improves the finish of the multilayer coating film formed on the electrodeposition coating film by the aqueous 3C1B process. The method for forming a coating film of the present invention provides a multilayer coating film with an excellent finish, even on a steel plate having a very rough coated surface with a center line mean roughness (Ra) of 1.0 to 1.70 μm (cutoff value 2.5 mm).

DESCRIPTION OF EMBODIMENTS

In order to obtain a multilayer coating film having excellent finish by an "aqueous 3C1B process", wherein a first colored aqueous coating composition, a second colored aqueous coating composition, and a clear coating composition are coated on an electrodeposition cured coating film and then simultaneously dried by heating, it is necessary to use a specific cationic electrodeposition coating composition (A) that makes it possible to obtain a coating film having resistance to a specific organic solvent. The method for forming the multilayer coating film of the present invention is explained below.

[Metal Object to be Coated]

There is no limitation to the objects to be coated that can apply the method of the present invention, as long as they are formed of a material to which electrocoating can be applied. Examples of usable materials include stainless steel, iron, steel, copper, zinc, tin, aluminum, alumite and like metals; alloys of these metals; a sheet on which at least one of these metals is plated; a sheet on which at least one of these metals is laminated; etc. If necessary, a surface treatment, a primer or the like is applied to improve the corrosion resistance and adhesion. For example, a chromium-based surface treatment may be applied to stainless steel. Specifically, an automobile body is a preferable example of an object to be coated, and the steel plate to be coated may be treated with zinc phosphate, as is usually done in the coating of an automobile body.

[Cationic Electrodeposition Coating Composition (a)]

In the method of the present invention for forming a coating film, it is essential to use cationic electrodeposition coating composition (A) that meets all the following requirements (i) to (iii).
 (i) a center line mean roughness (Ra) in a roughness curve of not greater than 0.50 μm (cutoff value: 2.5 mm);
 (ii) having a centre line average (Wca) in the filtered central line waviness curve of not greater than 0.50 (high-band cutoff value: 0.8 mm, low-band cutoff length: 8 mm); and
 (iii) a solvent swelling ratio of not greater than 30.0 mass % after immersed in any organic solvent selected from n-butyl alcohol, dipropylene glycol monobutyl ether, 2-ethyl-1-hexanol, 3-methoxybutyl acetate and diethylene glycol monoethyl ether maintained at 80° C. for 10 minutes.

In the present invention, the center line mean roughness (Ra) in the roughness curve described in requirement (i) is measured according to the method defined in JIS B601 (1982). Specifically, the center line mean roughness is defined as the value (expressed in μm) calculated by the formula below when a part the measuring length l is extracted from a roughness curve in the centerline direction, the centerline of the extracted part is defined as the X-axis, the direction perpendicular to the X-axis is defined as the Y-axis, and the roughness curve is expressed by y=f(x).

$$Ra = \frac{1}{l}\int_0^l |f(x)|dx \qquad \text{[Math. 1]}$$

Here, the roughness curve is obtained by cutting off the any longer surface waviness component than a predetermined wavelength from the profile curve to be measured. The predetermined wavelength is called the cut-off value. To be more specific, the cut-off value of the roughness curve is a wavelength corresponding to the frequency at which its gain becomes 75% when a high-pass filter having an attenuation rate of −12 dB/oct is used to obtain the roughness curve.

In the present invention, Ra is obtained from a roughness curve at a cut-off value of 2.5 mm.

Also, in the present invention, the measuring length l to obtain Ra is 50 mm.

In the present invention, requirement (ii), the centre line average in the filtered central line waviness curve (Wca; in this specification, this may be referred to as the filtered centre line waviness), is the centre line average value of the filtered central line waviness curve in a measuring length. The filtered central line waviness curve is obtained by removing components having wider crest intervals due to irregular shapes, etc. from the filtered waviness curve using a high-pass filter. The centre line average in filtered central line waviness curve is measured according to the method defined in JIS B610 (1976). Specifically, the filtered centre line waviness is defined as the value (expressed in μm) calculated by the formula below when a part the measuring length l is extracted from a filtered central line waviness curve in the centerline direction, the centerline of the extracted part is defined as the X-axis, the direction perpendicular to the X-axis is defined as the Y-axis, and the filtered central line waviness curve is expressed by $y=\{f(x)\}_c$.

$$Wca = \frac{1}{l}\int_0^l |\{f(x)\}_c| dx \quad \text{[Math. 2]}$$

Here, the filtered central line waviness curve is the curve obtained by removing long wavelength components such as straightness and roundness, from the filtered waviness curve. When obtaining the filtered central line waviness curve, the wavelength corresponding to the frequency at which the gain becomes 70% when using a high-pass filter having an attenuation rate of −12 dB/oct is called the cut-off value of the filtered central line waviness curve (in this specification, this may be referred to as the low-band cut-off value).

The filtered waviness curve is obtained by removing the short wavelength components of surface roughness from the profile curve. When obtaining a filtered waviness curve, the wavelength corresponding to the frequency at which the gain becomes 70% when using a low-pass filter having an attenuation rate of −12 dB/oct is called the cut-off value of the filtered waviness curve (in this specification, this may be referred to as the high-band cut-off value).

In the present invention, Wca is obtained from the filtered central line waviness curve under the conditions of a high-band cut-off value of 0.8 mm and a low-band cut-off value of 8 mm.

These organic solvents often added to first colored aqueous coating composition (B), second colored aqueous coating composition (C) and clear coating composition (D), and have a great affect on cured electrodeposition coating film immediately below, particularly at a preheating temperature. Therefore, by defining the "solvent swelling ratio", a multilayer coating film having excellent finish can be obtained in formation of a coating film on an electrodeposition coating film employing the aqueous 3C1B process.

To be more specific, cationic electrodeposition coating composition (A) yields a cured electrodeposition coating film (A1) that has a solvent swelling ratio of not more than 30.0 mass % (after 10 minutes of dipping) in any organic solvent selected from n-butyl alcohol, dipropylene glycol monobutyl ether, 2-ethyl-1-hexanol, 3-methoxy butyl acetate, and diethylene glycol monoethyl ether.

First colored aqueous coating composition (B), second colored aqueous coating composition (C), and clear coating composition (D) are applied in an uncured condition on top of the cured electrodeposition coating film (A1), so the organic solvents contained in coating composition (B), coating composition (C) and coating composition (D) permeate these uncured coating films and reach the cured coating film (A1). However, by using cationic electrodeposition coating composition (A) having a solvent swelling ratio of not more than 30.0 mass % in any of the organic solvents mentioned above, deterioration of the finish due to unevenness caused by the swelling of cured coating film (A1) is suppressed by the organic solvents from coating composition (B), coating composition (C) and coating composition (D). Coating composition (B), coating composition (C) and coating composition (D) are cured by heating under the above-described conditions, so that a coating film having excellent finish can be obtained by an aqueous 3C1B process.

In order to obtain an electrodeposition coating film (A1) that meets all of the above-mentioned requirements (i) to (iii), it is desirable that cationic electrodeposition coating composition (A) contain cationic amino group-containing modified epoxy resin (a1). Because the xylene resin structure in amino group-containing modified epoxy resin (a1) can render plasticity and hydrophobicity to the epoxy resin skeleton, the "solvent swelling ratio at 80° C." can be reduced without deteriorating the smoothness of the electrodeposition coating film.

Because the xylene resin structure in xylene formaldehyde resin (a12) contained in amino group-containing modified epoxy resin (a1) can render hydrophobicity to epoxy resin (a11), the anti-swelling property against solvents of cured coating film (A1) is improved; and therefore, the requirement (iii) regarding the "solvent swelling ratio at 80° C." can be easily met. Preferable formulations of cationic electrodeposition coating composition (A) that can form a coating film that meets requirements (i) to (iii) are disclosed below.

Amino Group-Containing Modified Epoxy Resin (A1):

Amino group-containing modified epoxy resin (a1) is an amino group-containing modified epoxy resin that is modified with a xylene formaldehyde resin obtained by reacting epoxy resin (a11) having an epoxy equivalent of 180 to 2,500, phenolic hydroxyl group-containing xylene formaldehyde resin (a12), and amino group-containing compound (a13).

Epoxy Resin (a11)

From the viewpoint of corrosion resistance and like properties of a coating film, an epoxy resin that is obtained by the reaction between a polyphenol compound and an epihalohydrin such as epichlorohydrin is particularly preferable as epoxy resin (a11) used as the starting material.

Examples of polyphenol compounds used for obtaining epoxy resin (a11) include bis(4-hydroxyphenyl)-2,2-propane (bisphenol A), bis(4-hydroxyphenyl)methane (bisphenol F), bis(4-hydroxycyclohexyl)methane (hydrogenated bisphenol F), 2,2-bis(4-hydroxycyclohexyl)propane (hydrogenated bisphenol A), 4,4'-dihydroxybenzophenone, bis(4-hydroxyphenyl)-1,1-ethane, bis(4-hydroxyphenyl)-1,1-isobutane, bis(4-hydroxy-2 or 3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, etc.

Among the epoxy resins obtained by the reaction between a polyphenol compound and an epichlorohydrin, a particularly preferable epoxy resin is that derived from bisphenol A and represented by formula (3), wherein n is an integer of 0 to 8.

[Chem. 3]

Formula (3)

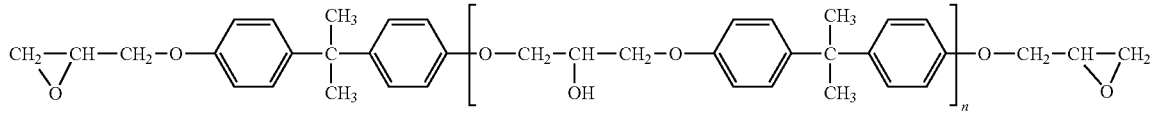

Epoxy resin (a11) may have an epoxy equivalent of 180 to 2,500, preferably 200 to 2,000, and more preferably 400 to 1,500. Epoxy resin (a11) has a number average molecular weight of at least 300, preferably 400 to 4,000, and more preferably 800 to 2,500.

In the present specification, the "number average molecular weight" and the "weight average molecular weight" are determined based on the method defined in JIS K 0124-83. More specifically, the "number average molecular weight" and the "weight average molecular weight" were determined from a chromatogram obtained with an RI refractometer at 40° C. and a flow rate of 1.0 ml/min using four separation columns, i.e., "TSK gelG4000HXL", "TSK gel G3000HXL", "TSK gel G2500HXL", and "TSK gel G2000HXL" (manufactured by Tosoh Corporation), tetrahydrofuran for GPC as an eluant, and the calibration curve of standard polystyrene.

Examples of commercially available epoxy resins include those manufactured by Japan Epoxy Resins Co. under the trade names jER828EL, jER1002, jER1004, and jER1007.

Xylene Formaldehyde Resin (a12)

Amino group-containing modified epoxy resin (a1) is a cationic resin using phenolic hydroxyl group-containing xylene formaldehyde resin (a12) capable of reacting with epoxy so that epoxy resin (a11) can be plasticized (modified).

Examples of such phenolic hydroxyl group-containing xylene formaldehyde resins (a12) include xylene and formaldehyde. Phenolic hydroxyl group-containing xylene formaldehyde resins (a12) may be obtained by condensing phenols in the presence of an acidic catalyst. Examples of the above-mentioned formaldehydes include industrially readily available formaldehyde-forming compounds such as formalin, paraformaldehyde and trioxane.

Furthermore, the above-mentioned phenols include monovalent or divalent phenolic compounds that have two or three reaction sites. Specific examples thereof are phenol, cresols (o-cresol, m-cresol, and p-cresol), para-octylphenol, nonylphenol, bisphenol propane, bisphenol methane, resorcin, pyrocatechol, hydroquinone, para-tert-butyl phenol, bisphenol sulfone, bisphenol ethers, and para-phenylphenol. These compounds may be used singly or in combination. Among these, phenol and cresols are particularly preferable.

Examples of the acidic catalysts used for condensing the above-mentioned xylene, formaldehyde, and phenols include sulfuric acid, hydrochloric acid, para toluenesulfonic acid and oxalic acid. Generally, sulfuric acid is particularly preferable. The amount of the acidic catalyst used is, because it is generally diluted in water in the formaldehyde aqueous solution, within the range of 10 to 50 mass % of the concentration in the aqueous solution.

The condensation reaction can be conducted, for example, by heating to a temperature, generally 80 to 100° C., at which xylene, phenols, water, formalin and other components contained in the reaction system reflux. The condensation reaction is usually completed within 2 to 6 hours.

The xylene formaldehyde resin can be obtained by allowing xylene, formaldehyde, and phenols to react by heating in the presence of an acidic catalyst under the above-mentioned conditions. It is also possible to obtain the xylene formaldehyde resin by reacting a preproduced xylene formaldehyde resin with phenols in the presence of an acidic catalyst.

The thus-obtained xylene formaldehyde resin (a12) has a viscosity of generally 20 to 50,000 mPa·s (25° C.), and preferably 30 to 15,000 mPa·s (25° C.). Xylene formaldehyde resin (a12) has a phenolic hydroxyl equivalent of generally 100 to 50,000, and preferably 200 to 10,000.

Amino Group-Containing Compound (a13)

Amino group-containing compound (a13) capable of reacting with epoxy resin (a11) is a component that can render cationic properties to an epoxy resin by introducing an amino group into an epoxy resin base to cationize the epoxy resin. Examples of amino group-containing compounds (a13) include monomethylamine, dimethylamine, monoethylamine, diethylamine, monoisopropylamine, diisopropylamine, monobutylamine, dibutylamine and like mono- or di-alkylamines; monoethanolamine, diethanolamine, mono (2-hydroxypropyl)amine, di(2-hydroxypropyl)amine, monomethylaminoethanol, monoethylaminoethanol and like alkanolamines; ethylenediamine, propylenediamine, butylenediamine, hexamethylenediamine, tetraethylenepentamine, pentaethylenehexamine, diethylaminopropylamine, diethylenetriamine, triethylenetetramine and like alkylene polyamines and ketiminized compounds of these polyamines; ethyleneimine, propyleneimine and like alkyleneimines; piperazine, morpholine, pyrazine and like cyclic amines. Additionally, it is also possible to use ketiminized amines obtained by ketiminizing primary amines, among the above-mentioned amines.

Amino group-containing modified epoxy resin (a1) that is used as a base resin in cationic electrodeposition coating composition (A) can be obtained by reacting the above-explained epoxy resin (a11) with xylene formaldehyde resin (a12) and amino group-containing compound (a13) by a known method.

The reaction of epoxy resin (a11) with xylene formaldehyde resin (a12) and amino group-containing compound (a13) may be conducted in any order. However, it is preferable that the epoxy resin (a11) simultaneously react with xylene formaldehyde resin (a12) and amino group-containing compound (a13).

The above-mentioned addition reaction may be conducted in an appropriate organic solvent at generally 80 to 170° C., and preferably 90 to 150° C. for generally 1 to 6 hours, and preferably 1 to 5 hours.

Examples of the organic solvents usable in the above reaction include toluene, xylene, cyclohexane, n-hexane and like hydrocarbons; methyl acetate, ethyl acetate, butyl acetate and like esters; acetone, methyl ethyl ketone, methyl isobutyl ketone, methyl amyl ketone and like ketones; dimethyl formamide, dimethyl acetamide and like amides; methanol, ethanol, n-propanol, iso-propanol and like alcohols; phenylcarbinol, methylphenylcarbinol and like aromatic alkyl alcohols; ethylene glycol monobutyl ether, diethylene glycol monoethyl ether and like etheralcohol-based compounds; and mixtures thereof.

There is no particular limitation to the proportion of the components used in the above-mentioned addition reaction, and the proportion can be suitably selected depending, on the application thereof and the like. However, the preferable contents of epoxy resin (a11), xylene formaldehyde resin (a12) and amino group-containing compound (a13) are as shown below based on the total mass of the solids components of the three compounds.

Epoxy resin (a11): generally 50 to 90 mass %, preferably 50 to 85 mass %, and more preferably 53 to 83 mass %;

Xylene formaldehyde resin (a12): generally 5 to 45 mass %, preferably 6 to 43 mass %, and more preferably 6 to 40 mass %; and Amino group-containing compound (a13): generally 5 to 25 mass %, preferably 6 to 20 mass %, and more preferably 6 to 18 mass %.

Amino Group-Containing Modified Epoxy Resin (a2):

Cationic electrodeposition coating composition (A) used in the method of the present invention for forming a coating film optionally comprises amino group-containing modified epoxy resin (a2) in addition to amino group-containing modified epoxy resin (a1). This makes it easier to further enhance the smoothness of the electrodeposition coating film, and attain specific ranges of the "center line mean roughness" (i.e., requirement (i)) and the "filtered centre line waviness (Wca)" (i.e., requirement (ii)), without adversely affecting the anti-swelling property against a specific organic solvent at 80° C. (i.e., requirement (iii)).

Amino group-containing modified epoxy resin (a2) can be obtained by allowing diepoxy compound (a21), which is compound (a211) represented by formula (4) or compound (a212) represented by formula (6), to react with epoxy resin (a22) having an epoxy equivalent of 170 to 500 and bisphenol compound (a23), and then reacting the resulting modified epoxy resin with amino group-containing compound (a24).

In the production of amino group-containing modified epoxy resin (a2), modified epoxy resin (I) obtained by reacting diepoxy compound (a21), epoxy resin (a22) having an epoxy equivalent of 170 to 500, and bisphenol compound (a23) is used as a starting material.

Diepoxy Compound (a21)

Compound (a211) represented by formula (4) can be used as diepoxy compound (a21).

Compound (a211)

[Chem. 4]

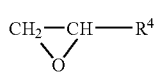

Formula (4)

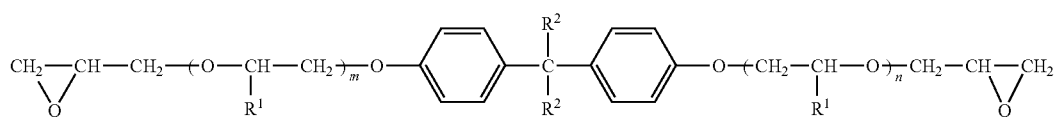

Wherein each $R^1$ may be the same or different, and each represents a hydrogen atom or a $C_{1-6}$ alkyl group, $R^2$ may be the same or different, and each represents a hydrogen atom or a $C_{1-2}$ alkyl group, and m and n, which represent the number of repeat units of alkylene oxide portion, are integers where m+n=1 to 20. Here, an example of $R^2$ is a methyl group.

Compound (a211) can be produced by adding alkylene oxide represented by formula (5) below to bisphenol A to obtain a hydroxy-terminated polyether compound,

[Chem. 5]

$$CH_2\underset{O}{-}CH-R^4$$

Formula (5)

wherein $R^4$ represents a hydrogen atom or a $C_{1-6}$ alkyl group, and then making the polyether compound react with epihalohydrin to obtain a diepoxy compound.

Examples of the alkylene oxides represented by formula (5) include ethylene oxide, propylene oxide, butylene oxide and like $C_{2-8}$ alkylene oxides.

Among these, ethylene oxide (a compound wherein $R^1$ in formula (5) is a hydrogen atom) and propylene oxide (a compound wherein $R^4$ in formula (5) is methyl) are preferable.

Compound (a212)

Compound (a212) represented by formula (6) may be used as diepoxy compound (a21).

[Chem. 6]

Formula (6)

$$CH_2\underset{O}{-}CH-CH_2\underset{}{-}\left[O\underset{}{-}(CH_2)_X\underset{R^3}{-}CH\right]_Y\underset{}{-}O-CH_2-CH\underset{O}{-}CH_2$$

wherein each $R^2$ may be the same or different, and each represents a hydrogen atom or a $C_{1-6}$ alkyl group, X is an integer of 1 to 9, Y is an integer of 1 to 50, and when Y is not less than 2, each $R^3$ in the repeating unit may be the same or different.

One example of the method for producing compound (a212) is that in which a hydroxyl-terminated polyalkylene oxide is obtained by subjecting the alkylene oxide represented by formula (5) to ring-opening polymerization using alkylene glycol as an initiator, and the polyalkylene oxide is subsequently made to react with epihalohydrin to form a diepoxy compound (this method may be referred to as method (1)).

Alternatively, compound (a212) can be obtained by reacting an alkylene glycol represented by formula (7) below or a polyether diol obtained by condensing two or more alkylene glycol molecules by dehydration with epihalohydrin to form a diepoxy compound (this method may be referred to as method (2));

[Chem. 7]

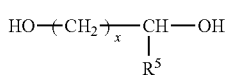

Formula (7)

wherein $R^5$ represents a hydrogen atom or a $C_{1-6}$ alkyl group, and X is an integer of 1 to 9.

Examples of the alkylene glycol represented by formula (7) used here include ethylene glycol, propylene glycol, trimethylene glycol, 1,4-butanediol, 1,3-butanediol, 1,5-pentanediol, 1,6-hexanediol, 1,8-octanediol and like $C_{2-10}$ alkylene glycols.

Examples of diepoxy compounds (a21) represented by formula (4) or formula (6) include Denacol EX-850, Denacol EX-821, Denacol EX-830, Denacol EX-841, Denacol EX-861, Denacol EX-941, Denacol EX-920, Denacol EX-931 (manufactured by Nagase ChemteX Corporation); Grisiere PP-300P and BPP-350 (manufactured by Sanyo Chemical Industries, Ltd.) etc. It is also possible to use compound (a211) and compound (a212) in a combined manner as diepoxide compound (a21).

Epoxy Resin (a22)

Epoxy resin (a22) used in the production of modified epoxy resin (I) is a compound having two or more epoxies per molecule. Epoxy resin (a22) has a "number average molecular weight" of generally 340 to 1,500, and preferably 340 to 1,000. Epoxy resin (a22) has an "epoxy equivalent" of generally 170 to 500, and preferably 170 to 400. In particular, epoxy resin (a22) obtainable by the reaction between a polyphenol compound and epihalohydrin is preferable.

Examples of the polyphenol compounds usable in the formation of the epoxy resin include: bis(4-hydroxyphenyl)-2,2-propane (bisphenol A), bis(4-hydroxyphenyl)methane (bisphenol F), bis(4-hydroxycyclohexyl)methane (hydrogenated bisphenol F), 2,2-bis(4-hydroxycyclohexyl)propane (hydrogenated bisphenol A), 4,4'-dihydroxybenzophenone, bis(4-hydroxyphenyl)-1,1-ethane, bis(4-hydroxyphenyl)-1,1-isobutane, bis(4-hydroxy-2 or 3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac etc.

Among the epoxy resins obtainable by the reaction of a polyphenol compound with epichlorohydrin, bisphenol A-derived epoxy resin represented by formula (8) below is preferable;

[Chem. 8]

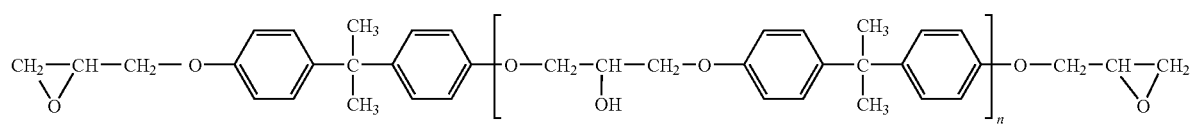

Formula (8)

wherein n=0 to 2.

Examples of commercially available epoxy resins include those manufactured by Japan Epoxy Resins Co. under the trade names jER828EL and jER1001.

Bisphenol Compound (a23)

Examples of bisphenol compound (a23) include compounds represented by formula (9) below,

[Chem. 9]

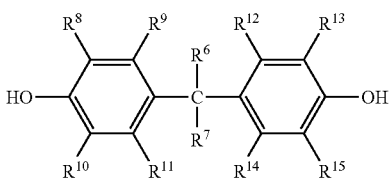

Formula (9)

wherein $R^6$ and $R^7$ represent a hydrogen atom or a $C_{1-6}$ alkyl group, and each $R^8$, $R^9$, $R^{10}$, $R^{11}$, $R^{12}$, $R^{13}$, $R^{14}$ and $R^{15}$ represents a hydrogen atom or a $C_{1-6}$ alkyl group.

Specific examples thereof include bis(4-hydroxyphenyl)-2,2-propane (bisphenol A) and bis(4-hydroxyphenyl)methane (bisphenol F).

Generally, modified epoxy resin (I) can be produced by mixing diepoxy compound (a21), epoxy resin (a22), and bisphenol compound (a23) to make these three compounds react in the presence of a suitably selected reaction catalyst such as dimethylbenzylamine, tributylamine and like tertiary amines; tetraethylammonium bromide, tetrabutylammonium bromide and like quaternary ammonium salts, at a reaction temperature of about 80 to 200° C., and preferably about 90 to 180° C. for generally 1 to 6 hours, and preferably 1 to 5 hours.

In the above reaction, a small amount of secondary amine may be used as the reaction catalyst. Examples of usable secondary amines include diethylamine, dibutylamine, diethanolamine, dipropanolamine, methylethanolamine etc. These secondary amines react with the epoxy in epoxy resin (a22) to form a tertiary amine, and the thus-formed tertiary amine functions as the reaction catalyst.

Three methods for producing modified epoxy resin (I) are as follows.

1. A method in which diepoxy compound (a21), epoxy resin (a22) and bisphenol compound (a23) are all mixed and reacted with each other to produce modified epoxy resin (I);

2. A method in which diepoxy compound (a21) and bisphenol compound (a23) are reacted so as to yield a reaction product, and subsequently, the reaction product and epoxy resin (a22) are mixed and reacted with each other to produce modified epoxy resin (I);

3. A method in which epoxy resin (a22) and bisphenol compound (a23) are reacted so as to yield a reaction product, and subsequently, the reaction product and diepoxy compound (a21) are mixed and reacted with each other to produce modified epoxy resin (I); and the like.

The reaction state can be traced by epoxy value.

In the production of modified epoxy resin (I), it is preferable that the proportions of each component is 1 to 35 mass %, preferably 2 to 30 mass % of diepoxy compound (a21); 10 to 80 mass %, preferably 15 to 75 mass % of epoxy resin (a22); and 10 to 60 mass %, preferably 15 to 50 mass % of bisphenol compound (a23), based on the total mass of the solids components of the components forming modified epoxy resin (I), i.e., diepoxy compound (a21), epoxy resin (a22) and bisphenol compound (a23). The above proportions are preferable in order to improve the anti-swelling property against solvents of cured coating film (A1), and to improve the finish and corrosion resistance in the aqueous 3C1B process.

In the above production, an organic solvent can be utilized where appropriate. Examples thereof include toluene, xylene, cyclohexane, n-hexane and like hydrocarbons; methyl acetate, ethyl acetate, butyl acetate and like esters; acetone, methyl ethyl ketone, methyl isobutyl ketone, methyl amyl ketone and like ketones; dimethyl formamide, dimethyl acetamide and like amides; methanol, ethanol, n-propanol, isopropanol and like alcohols; phenylcarbinol, methylphenylcarbinol and like aromatic alkyl alcohols; ethylene glycol monobutyl ether, diethylene glycol monoethyl ether and like etheralcohol-based compounds; and mixtures thereof. The thus-obtained modified epoxy resin (I) has an epoxy equivalent of 500 to 3,000, and preferably 600 to 2,500.

Amino Group-Containing Compound (a24)

In the present invention, usable amino group-containing compound (a24) capable of reacting with the above-mentioned modified epoxy resin (I) is a component that can render cationic properties to the above-mentioned modified epoxy resin (I) by introducing an amino group into modified epoxy resin (I) to cationize modified epoxy resin (I), and that has at least one active hydrogen capable of reacting with epoxy. Amino group-containing compound (a24) used for such a purpose may be the same amino group-containing compound (a13) used in the preparation of the above-mentioned amino group-containing modified epoxy resin (a1). Amino group-containing modified epoxy resin (a2) may be obtained by subjecting modified epoxy resin (I) to an addition reaction with amino group-containing compound (a24).

There is no strict limitation to the proportions of the components used in the above addition reaction, and the proportions may be suitably adjusted depending on the usage etc. of the electrodeposition coating composition; however, the proportion of modified epoxy resin (I) is 70 to 95 mass %, preferably 75 to 93 mass %, and the proportion of amino group-containing compound (A2) is 5 to 30 mass %, preferably 7 to 25 mass %, relative to the total mass of the solids components of modified epoxy resin (I) and amino group-containing compound (a24) used in the production of amino group-containing modified epoxy resin (a2). The above-mentioned addition reaction may be conducted in an appropriate organic solvent at generally 80 to 170° C., and preferably 90 to 150° C. for generally 1 to 6 hours, preferably 1 to 5 hours.

Examples of the organic solvents usable in the above reaction include toluene, xylene, cyclohexane, n-hexane and like hydrocarbons; methyl acetate, ethyl acetate, butyl acetate and like esters; acetone, methyl ethyl ketone, methyl isobutyl ketone, methyl amyl ketone and like ketones; dimethyl formamide, dimethyl acetamide and like amides; methanol, ethanol, n-propanol, isopropanol and like alcohols; phenylcarbinol, methylphenylcarbinol and like aromatic alkyl alcohols; ethylene glycol monobutyl ether, diethylene glycol monoethyl ether and like etheralcohol-based compounds; and mixtures thereof.

Blocked Polyisocyanate Curing Agent (b)

The aforementioned amino group-containing modified epoxy resin (a1) and amino group-containing modified epoxy resin (a2) may be used in combination with blocked polyisocyanate curing agent (b).

The above-mentioned blocked polyisocyanate curing agent (b) is an almost stoichiometric amounts addition-reaction product of a polyisocyanate compound and an isocyanate blocking agent. Polyisocyanate compounds usable in blocked polyisocyanate curing agent (b) may be known compounds. Examples thereof include aromatic, aliphatic or alicyclic polyisocyanate compounds such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI (polymethylene polyphenyl isocyanate), bis(isocyanatemethyl) cyclohexane, tetramethylene diisocyanate, hexamethylene diisocyanate, methylene diisocyanate, isophorone diisocyanate, and the like; cyclopolymers or biurets of these polyisocyanate compounds; and combinations thereof.

In particular, the use of a blocked polyisocyanate that is prepared by reacting a blocking agent with a polyisocyanate compound having a ring structure such as alicyclic polyisocyanate compounds or like aromatic polyisocyanate compounds having an aromatic ring can improve the anti-swelling property against solvents of the obtained cured coating film (A1).

Specifically, preferable polyisocyanate compounds are tolylene diisocyanate, xylylene diisocyanate, phenylene diisocyanate, diphenylmethane-2,4'-diisocyanate, diphenylmethane-4,4'-diisocyanate, crude MDI, isophorone diisocyanate, and the like.

The above-mentioned isocyanate blocking agent is added to isocyanate groups of a polyisocyanate compound to block the isocyanate groups. The blocked polyisocyanate compound obtained by such an addition is stable at room temperature; however, it is preferable that the blocking agent is dissociated to regenerate free isocyanate groups, when heated at a baking temperature of a coating film (usually 100 to 200° C.).

Examples of blocking agents usable in blocked polyisocyanate curing agent (b) include methylethylketoxime, cyclohexanone oxime and like oxime compounds; phenol, para-t-butylphenol, cresol and like phenol compounds; n-butanol, 2-ethylhexanol and like aliphatic alcohols; phenylcarbinol, methylphenylcarbinol and like aromatic alkyl alcohols; ethylene glycol monobutyl ether, diethylene glycol monoethyl ether and like ether-alcohol compounds; ε-caprolactam, γ-butyrolactam and like lactam compounds; etc.

With regard to cationic electrodeposition coating composition (A), it is preferable that the proportion of amino group-containing modified epoxy resin (a1) contained in a base resin is 30 to 60 mass %, preferably 32 to 55 mass %; and the proportion of amino group-containing modified epoxy resin (a2) arbitrarily contained in the base resin is 5 to 30 mass %, preferably 10 to 25 mass %; and the proportion of blocked polyisocyanate curing agent (b) is 10 to 40 mass %, preferably 15 to 35 mass %, relative to the total mass of the solids components of (a1), (a2) and (b). The above proportions are preferable to achieve excellent finish of the electrodeposition coated film without deteriorating the anti-swelling property against solvents and elution properties of cured coating film (A1), and to obtain a coated article comprising a multilayer coating film having excellent finish by the aqueous 3C1B process. Proportions outside the above range may deteriorate the foregoing coating composition properties and coating film performance, and are thus not preferable.

In the production of a cationic electrodeposition coating composition, amino group-containing modified epoxy resin (a1) contained in a base resin, amino group-containing modified epoxy resin (a2) arbitrarily contained in the base resin and blocked polyisocyanate curing agent (b) are thoroughly mixed with organic solvents and various additives, etc., such as surfactants, surface-adjusting agents, etc. to thereby prepare a preparation resin. The prepared preparation resin is rendered water-soluble or water-dispersible with organic carboxylic acid etc. to obtain an emulsion. The neutralization of the preparation resin may generally be performed with a known organic carboxylic acid. Preferred among these are acetic acid, formic acid, lactic acid, and mixtures thereof. Subsequently, a pigment dispersion paste is added to the emulsion, which is then adjusted using water to produce a cationic electrodeposition coating composition.

The above-mentioned pigment dispersion paste is a dispersion preliminary comprising fine particles of a coloring pigment, a rust-preventive pigment, an extender pigment, etc., and may be prepared by, for example, mixing a resin for pigment dispersion, a neutralizer, a pigment, etc., and subjecting the obtained mixture to dispersion in a dispersive mixer such as ball mill, sand mill, pebble mill, or the like.

Known resins may be used as the above-mentioned resin for pigment dispersion. Examples thereof include base resins having hydroxyl group and cationic group; surfactants, etc.; and resins such as tertiary amine-type epoxy resin, quaternary ammonium salt-type epoxy resin, tertiary sulfonium salt-type epoxy resin, and the like. The amount of the pigment dispersant used is preferably 1 to 150 parts by mass, particularly 10 to 100 parts by mass, relative to 100 parts by mass of the pigment and organic tin compound.

There is no particular limitation to the pigment above, and usable examples include coloring pigments such as titanium oxide, carbon black, colcothar, and the like; extender pigments such as clay, mica, baryta, calcium carbonate, silica, and the like; and rust-preventive pigments such as aluminum phosphomolybdate, aluminum tripolyphosphate, zinc oxide (zinc white), and the like. For the purposes of corrosion inhibition or rust prevention, bismuth compounds may also be used. Examples of bismuth compounds include bismuth oxide, bismuth hydroxide, basic bismuth carbonate, bismuth nitrate, bismuth silicate, organic acid bismuth, etc.

Additionally, in order to improve the curability of the coating films, an organic tin compound, such as dibutyltin dibenzoate, dioctyltin oxide, dibutyltin oxide, etc. may be utilized. However, in place of these organic tin compounds, rust-preventive pigments and/or bismuth compounds such as the above-mentioned zinc oxide (zinc white), etc. may also be used (in an increased amount), and/or refined for use in order to improve the curability of the coating films. The amount of the pigments used is preferably 1 to 100 parts by mass, particularly 10 to 50 parts by mass, relative to 100 parts by mass of the total solids components of the base resin and curing agent.

The cationic electrodeposition coating composition may be applied on a desired substrate surface by electrodeposition coating. Cationic electrodeposition coating is generally performed by adjusting the temperature of an electrodeposition bath to usually 15 to 35° C., and applying a current at a load voltage of 100 to 400V using a to-be-coated object as a cathode, in which the electrodeposition bath comprises an electrodeposition coating composition diluted with deionized water or the like to a solids content of 5 to 40 mass %, and the pH thereof being adjusted to 5.5 to 9.0. After the electrodeposition coating, the coated object is generally thoroughly washed with ultrafiltrate (UF filtrate), reverse osmosis water (RO water), industrial water, deionized water or the like so as to remove the cationic electrodeposition coating composition excessively adhered to the coated object.

The thickness of the electrodeposition coated film is not particularly limited, but is generally 5 to 40 µm, and preferably 12 to 30 µm, based on the thickness of the dried coating film. The baking and drying of the coating film are performed by heating the electrodeposition film at a surface temperature of the coated object of 110 to 200° C., preferably 140 to 180° C. for 10 to 180 minutes, preferably 20 to 50 minutes by means of a dryer such as an electric hot-air dryer, gas hot-air dryer or the like. The coating films can be cured by the above baking and drying. Cured coating film (A1) obtained by the above baking and drying meets the following requirements of:

(i) a center line mean roughness (Ra) in a roughness curve of not greater than 0.50 µm, preferably 0.05 to 0.40 µm, and more preferably 0.05 to 0.35 µm (cutoff value: 2.5 mm) as defined in JIS B 601 is;

(ii) a centre line average (Wca) in the filtered central line waviness curve of not greater than 0.50 µm, preferably 0.05 to 0.40 µm, and more preferably 0.05 to 0.37 (high-region cutoff value: 0.8 mm; low-region cutoff value: 8 mm) as defined in JIS B 610; and (iii) a solvent swelling ratio (Note 1) of not greater than 30.0 mass %, and preferably 0 to 28 mass % after immersed in any organic solvent selected from n-butyl alcohol, dipropylene glycol monobutyl ether, 2-ethyl-1-hexanol, 3-methoxy butyl acetate, and diethylene glycol monoethyl ether maintained at 80° C. for 10 minutes.

(Note 1) Solvent Swelling Ratio: the solvent swelling ratio (%) used herein refers to a value calculated in the following manner. Each electrodeposition coating composition is applied by electrodeposition coating to tin plates, which have been preliminary measured by mass, to a film thickness of 20 µm (when dried), which are then baked at 170° C. for 20 minutes to obtain test plates.

The test plates are allowed to cool, and are then subjected to 10-minute immersion in organic solvents selected from n-butyl alcohol, dipropylene glycol monobutyl ether, 2-ethyl-1-hexanol, 3-methoxy butyl acetate or diethylene glycol monoethyl ether maintained at 80° C. Thereafter, the test plates are withdrawn from the organic solvents, and any organic solvent adhered to the test plate surface is wiped off. The test plates are then left to stand at room temperature for one minute, and measured by mass. Afterward, "the mass of the coating film obtained by subtracting the mass of the tin plate . . . (i)" is calculated.

Subsequently, the test plates used for calculating "the mass of the coating film obtained by subtracting the mass of the tin plate . . . (i)" are dried at 140° C. for 30 minutes to determine "the mass of the coating film, from which the organic solvent is vaporized, obtained by subtracting the mass of the tin plate . . . (ii)". The mass (ii) is the mass of the coating film from which the organic solvent-soluble substance is removed.

The solvent swelling ratio (%) is obtained according to the following formula (10).

$$(((i)-(ii))/(ii))\times 100(\%) \qquad \text{formula (10)}$$

First Colored Aqueous Coating Composition (B)

According to the method of the present invention for forming a coating film, first colored aqueous coating composition (B) is applied on cured coating film (A1) of cationic electrodeposition coating composition (A) prepared in the above manner.

There is no particular limitation to the resin composition as first colored coating composition (B), and known resin compositions for thermosetting coating can be utilized. Preferable examples include a compound prepared by mixing a base resin such as acrylic resin, polyester resin, alkyd resin, etc., which have a cross-linkable functional group such as hydroxyl, carboxyl, carbonyl, amino, etc., with a cross-linking agent such as melamine resin, urea resin, (blocked) polyisocyanate compounds, carbodiimide compounds, etc., which can undergo a reaction with the above functional groups. As first colored coating composition (B), an aqueous colored coating composition is utilized from the viewpoint of reducing a volatile organic compound (VOC reduction). Hereinafter, an aqueous colored coating composition is described.

Examples of base resins in first colored aqueous coating composition (B) include polyester resin, acrylic resin, urethane resin, epoxy resin, etc., which have a sufficient amount of hydrophilic groups (e.g., carboxyl group, hydroxyl group, methylol group, amino group, sulfonate group, polyoxyethylene binding, etc.) to render the resin water-soluble or water-dispersible; and functional groups (e.g., hydroxyl group and carboxyl group), which can undergo a cross-linking reaction with a cross-linking agent.

Examples of polyester resins include polyester resins obtainable by subjecting at least one polybasic acid selected from alicyclic polybasic acids and other polybasic acids to a polycondensation reaction with at least one polyhydric alcohol selected from alicyclic polyhydric alcohols and other polyhydric alcohols. Examples of usable polyester resins further include alkyd resins obtainable by adding a fatty acid, and fats and oils such as oleic acid, linoleic acid, linseed oil, soybean oil, etc. to the above-mentioned polybasic acid and polyhydric alcohol.

Such alicyclic polybasic acids may be a compound having at least one alicyclic structure (mainly 4 to 6 membered rings) and two or more carboxyl groups per molecule. Examples thereof include cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid, methylhexahydrophthalic acid, and anhydrides thereof. Of these, particularly preferred is cyclohexane-1,4-dicarboxylic acid. Examples of other polybasic acids include compounds that have at least two carboxyl groups per molecule, such as phthalic acid, isophthalic acid, terephthalic acid, naphthalene dicarboxylic acid, 4,4'-diphenyldicarboxylic acid, diphenylmethane-4,4'-dicarboxylic acid, succinic acid, adipic acid, azelaic acid, sebacic acid, HET acid, maleic acid, fumaric acid, itaconic acid, trimellitic acid, pyromellitic acid, anhydrides thereof, etc.

The alicyclic polyhydric alcohols may be a compound having at least one alicyclic structure (mainly, 4 to 6 membered rings) and at least two hydroxyl groups per molecule. Examples thereof include 1,3-cyclohexane dimethanol, 1,4-cyclohexane dimethanol, tricyclodecanedimethanol, hydrogenated bisphenol A, hydrogenated bisphenol F, spiroglycol, dihydroxymethyltricyclodecane, and the like. Of these, 1,4-cyclohexane dimethanol is particularly preferable.

Among other polyhydric alcohols, examples of polyhydric alcohols containing two hydroxyl groups per molecule include ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentylglycol, hydroxypivalic acid neopentyl glycol ester and like glycols; and polylactone diols, which are obtained by adding lactones such as ε-caprolactone to the above glycols, bis(hydroxyethyl)terephthalate and like polyester diols. Further, examples of polyhydric alcohols containing three or more hydroxyl groups per molecule include glycerol, trimethylolpropane, trimethylolethane, diglycerol, triglycerin, 1,2,6-hexanetriol, pentaerythritol, dipentaerythritol, tripentaerythritol, sorbitol, mannitol, and the like.

Such polyester resins may have a weight average molecular weight of generally 1,000 to 1,000,000, and preferably 2,000 to 10,000; a hydroxyl value of generally 30 to 200 mg KOH/g, and preferably 50 to 180 mg KOH/g; and an acid value of generally 5 to 100 mg KOH/g, preferably 10 to 60 mg KOH/g.

Additionally, examples of acrylic resins include those obtained by copolymerizing a hydroxyl-containing radically polymerizable unsaturated monomer with other radically polymerizable unsaturated monomers using a general method (e.g., solution-polymerization methods, emulsion polymerization methods, etc.). The obtained acrylic resins may have a number average molecular weight of generally 1,000 to 50,000, and particularly 2,000 to 20,000; a hydroxyl value of generally 20 to 200 mg KOH/g, and particularly 50 to 150 mg KOH/g; and an acid value of 3 to 100 mg KOH/g, and particularly 20 to 70 mg KOH/g.

Examples of hydroxyl-containing radically polymerizable unsaturated monomers include hydroxyalkyl (meth)acrylates such as 2-hydroxyethyl (meth)acrylate, 2-hydroxypropyl (meth)acrylate, 3-hydroxypropyl (meth)acrylate, hydroxybutyl (meth)acrylate; PLACCEL FM-1, PLACCEL FM-2, PLACCEL FM-3, PLACCEL FA-1, PLACCEL FA-2, PLACCEL FA-3, (manufactured by Daicel Chemical Industries, Ltd., trade names, caprolactone-modified (meth) acrylic-acid hydroxy esters); and the like.

Examples of other radically polymerizable unsaturated monomers include carboxyl-containing radically polymerizable unsaturated monomers such as acrylic acid, methacrylic acid, crotonic acid, itaconic acid, maleic acid, fumaric acid, etc.; $C_{1-22}$ alkyl esters or cycloalkyl esters of (meth)acrylic acid, such as methyl (meth)acrylate, ethyl (meth)acrylate, propyl (meth)acrylate, butyl (meth)acrylate, hexyl (meth)acrylate, octyl (meth)acrylate, lauryl (meth)acrylate, 2-ethylhexyl (meth)acrylate, cyclohexyl (meth)acrylate, etc.; aromatic vinyl monomers such as styrene; (meth)acrylamides such as (meth)acrylic acid amide, N-butoxymethyl (meth) acrylamide, N-methylol (meth)acrylamide, etc., and derivatives thereof; and (meth)acrylonitrile, and the like.

Examples of urethane resins include resins obtained by reacting diols with a diisocyanate compound such as hexamethylene diisocyanate, isophorone diisocyanate, tolylene diisocyanate, etc., and chain-extended with a diamine etc.

Examples of epoxy resins include those obtainable by reacting a polyphenol compound with epihalohydrin such as epichlorohydrin. Specific examples of epoxy resins include those exemplified above in epoxy resin (a11).

Such base resins may be, depending on the type of hydrophilic group present therein, made water-soluble or water-dispersible by, for example, performing neutralization using a basic substance or an acid. In the production of a base resin by polymerization, the base resin may also be made water-dispersible by conducting emulsion polymerization of the monomer component in the presence of a surfactant and/or a water-soluble polymer substance.

Examples of cross-linking agents usable in first colored aqueous coating composition (B) include melamine resins, blocked polyisocyanate compounds, carbodiimide compounds, and the like. Examples of melamine resins include methylolated melamine resins, which are obtained by methylolating melamine with formaldehyde; alkylated melamine resin, which is obtainable by etherifying the methylol groups with monohydric alcohol; methylolated melamine resins or alkylated melamine resins, which have an imino group; and the like. Further, in the etherification of a methylol group, the mixed alkylated melamine resin obtained by using two or more types of monohydric alcohols may also be used.

Examples of monohydric alcohols include methyl alcohol, ethyl alcohol, n-propyl alcohol, i-propyl alcohol, n-butyl alcohol, i-butyl alcohol, 2-ethylbutanol, 2-ethylhexanol, and the like.

Specific examples of preferred melamine resins include methylated melamine resin, methylated melamine resin containing an imino group, methylated and butylated melamine resin, methylated and butylated melamine resin containing an imino group, and the like. Of these, methylated melamine resins containing an imino group are more preferred.

Examples of commercially available melamine resins include "Cymel 202", "Cymel 232", "Cymel 235", "Cymel 238", "Cymel 254", "Cymel 266", "Cymel 267", "Cymel 272", "Cymel 285", "Cymel 301", "Cymel 303", "Cymel 325", "Cymel 327", "Cymel 350", "Cymel 370", "Cymel 701", "Cymel 703", "Cymel 736", "Cymel 738", "Cymel 771", "Cymel 1141", "Cymel 1156", "Cymel 1158", etc. (manufactured by Japan Cytec Industries, Inc., trade names); "U-Van 120", "U-Van 20HS", "U-Van 2021", "U-Van 2028", "U-Van 2061" (manufactured by Mitsui Chemicals, Inc., trade names), etc.; "Melan 522 (manufactured by Hitachi Chemical Co., Ltd., trade name); and the like. These melamine resins undergo a reaction with a hydroxyl group of a base resin.

Blocked polyisocyanate compounds may be obtained by blocking, with a blocking agent, isocyanate groups of a polyisocyanate compound having at least two free isocyanate groups per molecule. Examples of usable polyisocyanate compounds may be known compounds, such as aromatic, aliphatic or alicyclic polyisocyanate compounds such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI (polymethylene polyphenyl isocyanate), bis(isocyanatemethyl)cyclohexane, tetramethylene diisocyanate, hexamethylene diisocyanate, methylene diisocyanate, isophorone diisocyanate, and the like; cyclopolymers or biurets of these polyisocyanate compounds; and combinations thereof.

The above blocking agent blocks free isocyanate groups. Examples thereof include methylethylketoxime, cyclohexanone oxime and like oxime compounds; phenol, para-t-butylphenol, cresol and like phenol compounds; n-butanol, 2-ethylhexanol and like aliphatic alcohols; phenylcarbinol, methylphenylcarbinol and like aromatic alkyl alcohols; ethylene glycol monobutyl ether, diethylene glycol monoethyl ether and like ether-alcohol compounds; ε-caprolactam, γ-butyrolactam and like lactam compounds; etc. Additionally, 3,5-dimethylpyrazole, 3-methyl pyrazole, 4-nitro-3,5-dimethylpyrazole, 4-bromo-3,5-dimethylpyrazole, etc. may also be used as such a blocking agent.

As the blocking agent for blocking the isocyanate groups of a polyisocyanate compound, hydroxycarboxylic acids such as hydroxypivalic acid, dimethylolpropionic acid, etc., which have at least one hydroxyl group and at least one carboxyl group, can also be utilized. Further, by neutralizing the carboxyl groups of the hydroxycarboxylic acid, blocked polyisocyanate compounds that are rendered water-dispersible can be obtained. Examples of commercially available blocked polyisocyanate compounds include Bayhydur BL5140 (manufactured by Sumika Bayer Urethane Co., Ltd., trade name). The blocked polyisocyanate compounds undergo a reaction with a hydroxyl group of a base resin.

The above-mentioned carbodiimide compounds are preferably water-soluble or water-dispersible polycarbodiimide, in terms of the smoothness etc. of the obtained coating films. There is no particular limitation to the water-soluble or water-dispersible polycarbodiimide compounds, so long as the polycarbodiimide compounds are stably dissolved or dispersed in an aqueous medium. Specific examples of the water-soluble polycarbodiimide compounds include "Carbodilite SV-02", "Carbodilite V-02", "Carbodilite V-02-L2", "Carbodilite V-04" (manufactured by Nisshinbo Industries, Inc., trade names), and the like. Examples of the water-dispersible polycarbodiimide compounds include "Carbodilite E-01", "Carbodilite E-02" (manufactured by Nisshinbo Industries, Inc., trade names), and the like. These polycarbodiimide compounds undergo a reaction with a hydroxyl group of a base resin. Other than the above cross-linking agents, hydrazide, semicarbazide, and an epoxy resin, for example, may also be used in first colored aqueous coating composition (B).

First colored aqueous coating composition (B) may further contain, as necessary, an organic solvent, a thickener, a coloring pigment, a light interference pigment, an extender pigment, a dispersant, an antisettling agent, a catalyst promoting an urethanization reaction (e.g., organic tin compounds etc.), a catalyst promoting a cross-linking reaction of a hydroxyl group of a base resin with a melamine resin (e.g., acid catalysts), a defoaming agent, a rust preventive, a UV absorber, a surface control agent, and the like.

In particular, first colored aqueous coating composition (B) used in the method of the present invention for forming a coating film preferably contains a certain amount of a polar organic solvent (s) having no more than 11 carbon atoms to improve compatibility of the additives contained in first colored aqueous coating composition (B), to prevent mixing of layers and sagging, and to achieve leveling of the coating films. The term "polar organic solvent (s)" used herein refers to an organic solvent having permittivity (20° C.) of 3 or more, and preferably 10 or more. Examples of such polar organic solvents (s) having no more than 11 carbon atoms include n-butyl alcohol, n-octyl alcohol, 2-ethyl-1-hexanol, ethylene glycol mono-2-ethylhexylether, diethylene glycol monoethyl ether, propylene glycol mono n-butyl ether, dipropylene glycol monobutyl ether, benzyl alcohol, propylene glycol mono-2-ethylhexyl ether, propylene glycol monophenyl ether and like alcohol solvents; n-butyl acetate, isobutyl acetate, isoamyl acetate, methylamyl acetate, ethylene glycol monobutyl ether acetate, 3-methoxy butyl acetate and like ester solvents; and cyclohexanone and like ketone solvents. These may be used singly, or in a combination of two or more.

It is preferable that first colored aqueous coating composition (B) contains a polar organic solvent (s) having no more than 11 carbon atoms in an amount of 1 to 150 parts by mass, preferably 10 to 70 parts by mass, and more preferably 15 to 40 parts by mass, relative to 100 parts by mass of the total resin components (base resin and cross-linking agent). Such an amount is preferable because compatibility of the resin components and the additives can be improved, thereby preventing sagging and mixing of layers with second colored aqueous coating composition (C), while achieving leveling of the coating films. First colored aqueous coating composition (B) may further contain, as necessary, a thickener for the desired finish ("to improve anti-sagging properties" at a vertical part).

To first colored aqueous coating composition (B), an adequate amount of water is added to adjust the solids content thereof to usually 30 to 70 mass %, preferably 40 to 55 mass %, in order to use it for a coating.

Examples of such thickeners include silicate, metal silicate, montmorillonite, organic montmorillonite, colloidal alumina and like inorganic thickeners; a copolymer of polyacrylic acid and (meth)acrylic-acid ester, sodium polyacrylate and like polyacrylic acid thickeners; associative thickeners having a hydrophilic portion and a hydrophobic portion per molecule, and exhibiting effective thickening action by the hydrophobic portion being absorbed to the pigment or onto the surface of emulsion particles contained in the composition, or by the hydrophobic portions being mutually associated with each other; carboxymethylcellulose, methylcellulose, hydroxyethylcellulose and like cellulose-derived thickeners; casein, sodium caseinate, ammonium caseinate and like protein thickeners; sodium alginate and like alginic acid thickeners; polyvinyl alcohol, polyvinylpyrrolidone, polyvinylbenzyl ether copolymer and like polyvinyl thickeners; Pluronic polyether, polyether dialkyl ester, polyether dialkyl ether, polyether epoxy modified products and like polyether thickeners; partial esters of vinyl methyl ether-maleic anhydride copolymer and like maleic anhydride copolymer thickeners; polyamide amine salt and like polyamide thickeners; and the like. These thickeners may be used singly, or in a combination of two or more.

Examples of the commercially available polyacrylic acid thickeners include "Primal ASE-60", "Primal TT-615", "Primal RM-5" (manufactured by Rohm & Haas Co., Ltd., trade names); "SN Thickener 613", "SN Thickener 618", "SN Thickener 630", "SN Thickener 634", "SN Thickener 636" (manufactured by Sannopuko Co., trade names); and the like. Examples of commercially available associative thickeners include "UH-420", "UH-450", "UH-462", "UH-472", "UH-540", "UH-752", "UH-756VF", "UH-814N" (manufactured by ADEKA Corporation, trade names); "Primal RM-8W", "Primal RM-825", "Primal RM-2020NPR", "Primal RM-12W", "Primal SCT-275" (manufactured by Rohm & Haas Co., Ltd., trade names); "SN Thickener 612", "SN Thickener 621N", "SN Thickener 625N", "SN Thickener 627N", "SN Thickener 660T" (manufactured by Sannopuko Co., trade names); and the like.

Examples of commercially available urethane associative thickeners include the above-mentioned "UH-420", "UH-462", "UH-472", "UH-540", "UH-756VF", "UH-814N", "SN Thickener 612", "SN Thickener 621N", "SN Thickener 625N", "SN Thickener 627N", "SN Thickener 660T", and the like.

When first colored aqueous composition (B) contains the above thickener, the amount thereof is preferably 0.01 to 10 parts by mass, more preferably 0.05 to 3 parts by mass, and still more preferably 0.1 to 2 parts by mass, relative to 100 parts by mass of the total of hydroxyl-containing resin and curing agent.

First colored aqueous coating composition (B) may be prepared by dissolving or dispersing each of the above components in an aqueous medium by a known method, and may be applied on cured coating film (A1) of the above-mentioned electrodeposition coating composition (A) after, for example, adjusting the viscosity thereof to 50 seconds at 20° C. using a Ford cup No. 4, and the solids content concentration to 20 to 70 mass %, preferably 35 to 60 mass %. The application of first colored aqueous coating composition (B) may be performed using a known method, such as air spray, airless spray, electrostatic coating, or the like. The film thickness may usually be 10 to 100 μm, and preferably 10 to 35 μm (when dried).

With respect to the coated coating film, the coated object may usually be directly or indirectly preheated in a drying furnace at 60 to 120° C., preferably at 70 to 110° C. for about 1 to about 60 minutes; alternatively, setting may be performed on the coated surface of the coated object at room temperature or at 25 to less than 70° C. Cationic electrodeposition coating composition (A) used in the present invention has the aforementioned features (requirements (i) to (iii)). Therefore, even when the heated polar organic solvent (s) permeates into cured coating film (A1) during the preheating of first colored aqueous coating composition (B), cured coating film (A1) is hardly affected thereby, and thus, the multilayer coating film will have excellent finish.

Second Colored Aqueous Coating Composition (C)

According to the method of the present invention, second colored aqueous coating composition (C) is applied on an uncured coating film comprising first colored aqueous coating composition (B). As second colored aqueous coating composition (C), an aqueous colored coating composition is utilized from the viewpoint of reducing a volatile organic compound (VOC reduction).

The usable second colored aqueous coating composition (C) may contain, for example, a base resin such as polyester resin, acrylic resin, alkyd resin, urethane resin, epoxy resin, etc., which have a cross-linkable functional group such as carboxyl, hydroxyl, carbonyl, amino, etc., as mentioned above with respect to first colored aqueous coating composition (B); and a cross-linking agent such as polyisocyanate compounds which may be blocked, melamine resin, urea resin, carbodiimide compound, hydrazide, semicarbazide, epoxy resin, etc., as mentioned above with respect to first colored aqueous coating composition (B). Second colored aqueous coating composition (C) may further suitably contain, as necessary, a pigment, a defoaming agent, a thickener, a rust preventive, a UV absorber, a surface control agent, and the like.

Second colored aqueous coating composition (C) may further suitably contain, as necessary, an organic solvent, a coloring pigment, a light interference pigment, an extender pigment, a dispersant, a thickener, an antisettling agent, a catalyst promoting an urethanization reaction (e.g., organic tin compounds etc.), a catalyst promoting a cross-linking reaction of a hydroxyl group of a base resin with a melamine resin (e.g., acid catalysts), a defoaming agent, a rust preventive, a UV absorber, a surface control agent, and the like.

In particular, second colored aqueous coating composition (C) used for the method of the present invention for forming a coating film preferably contains a polar organic solvent (s) having no more than 11 carbon atoms in an amount of 1 to 150 parts by mass, preferably 20 to 120 parts by mass, relative to 100 parts by mass of the total of resin components (base resin and cross-linking agent). The amount within the above range is preferable because compatibility of the additives contained in second colored aqueous coating composition (C) can be improved, thereby preventing mixing of layers and sagging; further, due to the leveling of the coating films achieved thereby, the finish of the multilayer coating film prepared by the aqueous 3C1B process can be improved. Examples of the polar organic solvents (s) having no more than 11 carbon atoms are the same as those exemplified as the polar organic solvents (s) in first colored aqueous coating composition (B) above.

To second colored aqueous coating composition (C), an adequate amount of water is added to adjust the solids content thereof to usually 5 to 50 mass %, preferably 15 to 30 mass % so as to perform a coating.

The application of second colored aqueous coating composition (C) may be performed using a known method, such as air spray, airless spray, electrostatic coating, or the like. The film thickness may be 5 to 40 μm, and preferably 10 to 30 μm (when dried).

The coated coating film may be appropriately subjected to preheating and/or setting. Preheating may generally be performed by directly or indirectly heating a coated object in a drying furnace at 60 to 120° C., preferably at 70 to 120° C. for about 1 to about 60 minutes. Setting may be performed on the coated surface of a coated object at room temperature or at 25 to less than 70° C. Cationic electrodeposition coating composition used in the present invention has the aforementioned features (requirements (i) to (iii)). Therefore, even when the heated polar organic solvent (s) contained in second colored aqueous coating composition (C) permeates into cured coating film (A1) during the preheating of second colored aqueous coating composition (C), cured coating film (A1) is hardly affected thereby, and thus, the multilayer coating film will have excellent finish.

Clear Coating Composition (D)

According to the method of the present invention, clear coating composition (D) is applied on an uncured coating film comprising second colored coating composition (C) obtained in the above manner. Clear coating composition (D) may be an organic solvent-based clear coating composition or aqueous clear coating composition (D), which are usually used, for example, in the coating of an automobile body.

Usable organic solvent-based clear coating compositions or aqueous clear coating composition may be those containing, as a base resin, acrylic resin, polyester resin, alkyd resin, urethane resin, epoxy resin, etc. that have a cross-linkable functional group such as hydroxyl, carboxyl, epoxy, etc.; and as cross-linking agents, melamine resin, urea resin, a polyisocyanate compound which may be blocked, a carboxyl-containing compound or resin, an epoxy-containing compound or resin; and the like (e.g., an acid/epoxy resin curing-type clear coating composition).

Examples of organic solvents usable in the organic solvent-based clear coating composition include acetone, methyl ethyl ketone, methyl butyl ketone, methyl isobutyl ketone, cyclohexanone, methyl amyl ketone and like ketones; methanol, ethanol, 2-propanol, n-propanol, iso-propanol, 2-methyl-1-propanol, n-butyl alcohol, 2-methoxyethanol, n-octyl alcohol, 2-ethyl-1-hexanol and like alcohols; tetrahydrofuran, 1,4-dioxane, 1,2-dimethoxyethane, diethylene glycol monoethyl ether, dipropylene glycol monobutyl ether and like ethers; methyl acetate, ethyl acetate, butyl acetate, carbitol acetate, 3-methoxy butyl acetate and like esters; dimethylformamide, dimethylacetamide and like amides; toluene, xylene, cyclohexane, n-hexane and like hydrocarbons. Examples of other organic solvents include methyl phthalate, diethyl phthalate, dibutyl phthalate, ethylene glycol monobutyl ether, diethylene-glycol monobutyl ether, mixed solvents of dimethyl adipate/glutaric acid dimethyl/succinic acid dimethyl ("DBE" (manufactured by Du Pont, trade name)), N-methyl-2-pyrrolidone, isophorone, Swasol #1000 (manufacture by Maruzen Petrochemical Co., Ltd., trade name, aromatic organic solvent), and the like. These may be used singly, or in a combination of two or more.

Clear coating composition (D) may contain, as necessary, a coloring pigment and/or a light interference pigment in such an amount that does not impair the transparency of the coating film. The clear coating composition (D) may further suitably contain an extender pigment, a UV absorber, etc.

Clear coating composition (D) may be applied on the surface of a coating film comprising second colored aqueous coating composition (C) using a known method, such as air spray, airless spray, electrostatic coating, or the like. The film thickness is usually 10 to 60 μm, and preferably 25 to 50 μm (when dried).

Drying by Heating of Multilayer Coating Film

The thus-obtained multilayer coating film comprising three layers of uncured coating films, i.e., a coating film of first colored aqueous coating composition (B), a coating film of second colored aqueous coating composition (C) and a coating film of clear coating composition (D), is simultaneously cured by heating at 80 to 170° C., preferably 120 to 160° C. for about 20 to about 40 minutes with a typical means for baking, such as hot-air heating, infrared heating, induction heating, or the like. Thereby, a multilayer coating film having excellent finish and corrosion resistance can be obtained.

A portion of the organic solvent contained in first colored aqueous coating composition (B), second colored aqueous coating composition (C) and clear coating composition (D) will permeate into the lowest layer, i.e., cured coating film (A1) comprising cationic electrodeposition coating composition (A), due to the heat applied during the setting, preheating, and heat-drying after the coating. However, cationic electrodeposition coating composition (A) used in the present invention has the above-mentioned features (requirements (i) to (iii)), and therefore, even when the organic solvent contained in first colored aqueous coating composition (B), second colored aqueous coating composition (C) and clear coating composition (D) permeates into cured coating film (A1), cured coating film (A1) is not affected thereby. Further, with the use of the aqueous 3C1B process, in which three layers of a coating film of first colored aqueous coating composition (B), a coating film of second colored aqueous coating composition (C) and a coating film of clear coating composition (D) are simultaneously cured so as to form a coating film, a coated article comprising a multilayer coating film with excellent finish and excellent corrosion resistance can be obtained.

EXAMPLES

The present invention is described below in more detail with reference to Production Examples, Examples, and Comparative Examples. However, the present invention is not limited thereto. In the Examples, "parts" and "%" are expressed in mass.

Production of Amino Group-Containing Modified Epoxy Resin (a1)

Production Example 1

Production of Xylene-Formaldehyde Resin No. 1

A 2-liter flask equipped with a thermometer, a reflux condenser, and a stirrer was charged with 480 parts of 50% formalin, 110 parts of phenol, 202 parts of 98% industrial sulfuric acid, and 424 parts of m-xylene. The resulting mixture was allowed to react at 84 to 88° C. for 4 hours.

After completion of the reaction, the reaction mixture was allowed to stand to separate a resin phase and a sulfuric acid aqueous phase. After the resin phase was washed with water 3 times, unreacted m-xylene was removed under the conditions of 20 to 30 mmHg and 120 to 130° C. for 20 minutes. As a result, 480 parts of phenol-modified xylene-formaldehyde resin No. 1 having a viscosity of 1,050 mPa·s (25° C.) was obtained.

Production Example 2

Production of Xylene-Formaldehyde Resin No. 2

The procedure of Production Example 1 was repeated, except that 55 parts of o-cresol was used in place of 55 parts of phenol. As a result, o-cresol-modified xylene-formaldehyde resin No. 2 was obtained.

Production Example 3

Production of Amino Group-Containing Modified Epoxy Resin No. 1

A flask was charged with 1,140 parts of jER828EL (Note 2), 456 parts of Bisphenol A, and 0.2 parts of dimethylbenzylamine. The resulting mixture was allowed to react at 130° C. until an epoxy equivalent of 820 was reached. (Note 2) jER828EL: an epoxy resin, manufactured by Japan Epoxy Resins Co., Ltd., epoxy equivalent: 190, number average molecular weight: 380.

Subsequently, 220 parts of methyl isobutyl ketone and 200 parts of ethylene glycol monobutyl ether were added, and then 300 parts of xylene-formaldehyde resin No. 1 obtained in Production Example 1 was added. Subsequently, 95 parts of diethanolamine and 127 parts of a methyl isobutyl ketone-ketiminized product of diethylene triamine (a methyl isobutyl ketone solution, purity: 84%) were added, and the resulting mixture was allowed to react at 120° C. for 4 hours. As a result, an amino group-containing modified epoxy resin having a resin solids content of 80%, i.e., amino group-containing modified epoxy resin No. 1 solution was obtained. Amino group-containing modified epoxy resin No. 1 had an amine value of 47 mg KOH/g, and a number average molecular weight of 2,500.

Production Example 4

Production Example of Amino Group-Containing Modified Epoxy Resin No. 2

The procedure of Example 3 was repeated, except that 300 parts of o-cresol-modified xylene-formaldehyde resin No. 2 obtained in Production Example 2 was used in place of 300 parts of xylene-formaldehyde resin No. 1. As a result, amino group-containing modified epoxy resin No. 2 having an amine value of 47 mg KOH/g and a resin solids content of 80% was obtained.

Production of Amino Group-Containing Modified Epoxy Resin (a2)

Production Example 5

Production of Amino Group-Containing Modified Epoxy Resin No. 3

A 2-liter flask equipped with a thermometer, a reflux condenser, and a stirrer was charged with 471 parts of Denacol EX-931 (Note 3), 950 parts of jER828EL (Note 2), 456 parts of bisphenol A, and 0.8 parts of tetrabutylammonium bromide. The resulting mixture was allowed to react at 160° C. until an epoxy equivalent of 950 was reached.

Subsequently, 430 parts of methyl isobutyl ketone was added, and then 150 parts of diethanolamine and 127 parts of a methyl isobutyl ketone-ketiminized product of diethylene triamine (a methyl isobutyl ketone solution, purity: 84%) were added. The resulting mixture was allowed to react at 120° C. for 4 hours to obtain amino group-containing modified epoxy resin No. 3 solution having a resin solids content of 80%. Amino group-containing modified epoxy resin No. 3 had an amine value of 60 mg KOH/g and a number average molecular weight of 2,500.

(Note 3) Denacol EX-931: a diepoxy compound, manufactured by Nagase ChemteX Corporation, corresponding to the compound of Formula (2).

Production Example 6

Production of Amino Group-Containing Modified Epoxy Resin No. 4

A 2-liter flask equipped with a thermometer, a reflux condenser, and a stirrer was charged with 340 parts of Glyci-ale BPP-350 (Note 4), 950 parts of jER828EL (Note 2), 456 parts of bisphenol A, and 0.8 parts of tetrabutylammonium bromide. The resulting mixture was allowed to react at 160° C. until an epoxy equivalent of 900 was reached.
(Note 4)
Glyci-ale BPP-350: a diepoxy compound, manufactured by Sanyo Chemical Industries, Ltd., corresponding to Formula (1).

Subsequently, 400 parts of methyl isobutyl ketone was added, and then 150 parts of diethanolamine and 127 parts of a methyl isobutyl ketone-ketiminized product of diethylene triamine (a methyl isobutyl ketone solution, purity: 84%) were added. The resulting mixture was allowed to react at 120° C. for 4 hours. As a result, an amino group-containing modified epoxy resin having a resin solids content of 80%, i.e., amino group-containing modified epoxy resin No. 5 solution was obtained. Amino group-containing modified epoxy resin No. 4 had an amine value of 64 mg KOH/g, and a number average molecular weight of 2,500.

Production of Blocked Polyisocyanate-Curing Agent (b)

Production Example 7

Production of Curing Agent No. 1

270 parts of Cosmonate M-200 (trade name, manufactured by Mitsui Chemicals, Inc., crude MDI) and 127 parts of methyl isobutyl ketone were added to a reaction vessel, and the temperature was raised to 70° C. Further, 236 parts of ethylene glycol monobutyl ether was added dropwise over a period of 1 hour. After the temperature was raised to 100° C., sampling was performed over time to confirm that absorption peaks derived from unreacted isocyanate groups could no longer be observed. As a result, curing agent No. 1 having a resin solids content of 80% was obtained.

Production Example 8

Production of Curing Agent No. 2

222 parts of isophorone diisocyanate and 99 parts of methyl isobutyl ketone were added to a reaction vessel, and the temperature was raised to 60° C. Further, 174 parts of methyl ethyl ketoxime was added dropwise over a period of 2 hours, and the temperature was raised to 70° C. Sampling was performed over time to confirm that absorption peaks derived from unreacted isocyanate groups could no longer be observed. As a result, curing agent No. 2 having a resin solids content of 80% was obtained.

Production Example 9

Production of Curing Agent No. 3

168 parts of hexamethylene diisocyanate and 86 parts of methyl isobutyl ketone were added to a reaction vessel, and the temperature was raised to 60° C. Further, 174 parts of methyl ethyl ketoxime was added dropwise over a period of 2 hours, and the temperature was raised to 70° C. Sampling was performed over time to confirm that absorption peaks derived from unreacted isocyanate groups could no longer be observed. As a result, curing agent No. 3 having a resin solids content of 80% was obtained.

Production of Emulsion for Cationic Electrodeposition Coating Composition

Production Example 10

Production of emulsion No. 1

62.5 parts (solids content: 50 parts) of amino group-containing modified epoxy resin No. 1 obtained in Production Example 3, 25.0 parts (solids content: 20.0 parts) of amino group-containing modified epoxy resin No. 3, and 37.5 parts (solids content: 30.0 parts) of curing agent No. 1 obtained in Production Example 7 were mixed. Further, 13.0 parts of 10% acetic acid was added, and the resulting mixture was uniformly stirred. While vigorously stirring, 156.0 parts of deionized water was added dropwise over a period of about 15 minutes to obtain emulsion No. 1.

Production Examples 11 to 19

Production of Emulsions Nos. 2 to 10 (for Examples)

Emulsions Nos. 2 to 10 were produced in the same manner as in Production Example 10, except that the formulations shown in Table 1 were used.

Production Example 20 to 23

Production of Emulsion Nos. 11 to 14 (for Comparative Examples)

Emulsions Nos. 2 to 10 were produced in the same manner as in Production Example 10, except that the formulations shown in Table 2 were used.

TABLE 2

| | | Production Example 20 | Production Example 21 | Production Example 22 | Production Example 23 |
|---|---|---|---|---|---|
| Emulsion Formulation | Base resin No. 3 | No. 11<br>87.5<br>(70.0) | No. 12<br>87.5<br>(70.0) | No. 13<br>87.5<br>(70.0) | No. 14 |
| | Base resin No. 4 | | | | 87.5<br>(70.0) |
| | Curing agent No. 1 | 37.5<br>(30.0) | | | |
| | Curing agent No. 2 | | 37.5<br>(30.0) | | |
| | Curing agent No. 3 | | | 37.5<br>(30.0) | 37.5<br>(30.0) |
| | 10% acetic acid | 13.0 | 13.0 | 13.0 | 13.0 |
| | Deionized water | 156.0 | 156.0 | 156.0 | 156.0 |
| Emulsion Solids content: 34% | | 294.0<br>(100.0) | 294.0<br>(100.0) | 294.0<br>(100.0) | 294.0<br>(100.0) |

Production Example 24

Production of Resin for Pigment Dispersion 390 parts of bisphenol A, 240 parts of PLACCEL 212 (trade name, polycaprolactone diol, manufactured by Daicel Chemical Industries, Ltd., weight average molecular weight:

TABLE 1

| | | Production Example 10 | Production Example 11 | Production Example 12 | Production Example 13 | Production Example 14 | Production Example 15 | Production Example 16 | Production Example 17 | Production Example 18 | Production Example 19 |
|---|---|---|---|---|---|---|---|---|---|---|---|
| Emulsion Formulation | Base resin No. 1 | No. 1<br>62.5<br>(50.0) | No. 2<br>50.0<br>(40.0) | No. 3<br>75.0<br>(60.0) | No. 4<br>62.5<br>(50.0) | No. 5<br>87.5<br>(70.0) | No. 6<br>62.5<br>(50.0) | No. 7<br>62.5<br>(50.0) | No. 8 | No. 9<br>62.5<br>(50.0) | No. 10<br>87.5<br>(70.0) |
| | Base resin No. 2 | | | | | | | | 62.5<br>(50.0) | | |
| | Base resin No. 3 | 25.0<br>(20.0) | 37.5<br>(30.0) | 12.5<br>(10.0) | 12.5<br>(10.0) | | 25.0<br>(20.0) | 25.0<br>(20.0) | 25.0<br>(20.0) | | |
| | Base resin No. 4 | | | | | | | | | 25.0<br>(20.0) | |
| | Curing agent No. 1 | 37.5<br>(30.0) | 37.5<br>(30.0) | 37.5<br>(30.0) | 50.0<br>(40.0) | 37.5<br>(30.0) | | | 37.5<br>(30.0) | 37.5<br>(30.0) | |
| | Curing agent No. 2 | | | | | | 37.5<br>(30.0) | | | | 37.5<br>(30.0) |
| | Curing agent No. 3 | | | | | | | 37.5 | | | |
| | 10% acetic acid | 13.0 | 13.0 | 13.0 | 13.0 | 13.0 | 13.0 | 13.0 | 13.0 | 13.0 | 13.0 |
| | Deionized water | 156.0 | 156.0 | 156.0 | 281.0 | 156.0 | 281.0 | 281.0 | 281.0 | 281.0 | 281.0 |
| Emulsion Solids content: 34% | | 294.0<br>(100.0) | 294.0<br>(100.0) | 294.0<br>(100.0) | 294.0<br>(100.0) | 294.0<br>(100.0) | 294.0<br>(100.0) | 294.0<br>(100.0) | 294.0<br>(100.0) | 294.0<br>(100.0) | 294.0<br>(100.0) |

The parenthesized numerals in the formulations denote the solids content.

about 1,250), and 0.2 parts of dimethylbenzylamine were added to 1,010 parts of jER828EL (see Note 2). The resulting mixture was allowed to react at 130° C. until an epoxy equivalent of about 1,090 was reached.

Subsequently, 134 parts of dimethylethanolamine and 150 parts of a 90% lactic acid aqueous solution were added, and the resulting mixture was allowed to react at 120° C. for 4 hours. Subsequently, methyl isobutyl ketone was added to adjust the solids content. As a result, an ammonium salt-type resin for pigment dispersion having a solids content of 60% was obtained. The resin for the dispersion contained an ammonium salt in a concentration of 0.78 mmol/g.

Production Example 25

Production of Pigment Dispersion Paste No. 1 (Pigment Content: 22.8 Parts)

8.3 parts (solids content: 5.0 parts) of the resin for pigment dispersion with a solids content of 60% obtained in Production Example 24, 14.5 parts of titanium oxide, 7.0 parts of refined clay, 0.3 parts of carbon black, 1 part of bismuth hydroxide, 1.0 part of dioctyltin oxide, and 27.3 parts of deionized water were added and dispersed using a ball mill for 20 hours. As a result, pigment-dispersed paste No. 1 having a solids content of 55% was obtained.

Production Example 26

Production of Pigment Dispersion Paste No. 2 (Pigment Content: 35.3 Parts)

The procedure of Production Example 25 was repeated, except that the formulation shown in Table 3 was used. As a result, pigment dispersion paste No. 2 having a solids content of 55% was obtained.

TABLE 3

| | | Production Example 25 | Production Example 26 |
|---|---|---|---|
| Pigment dispersion paste | | No. 1 | No. 2 |
| Pigment dispersion resin | Resin for dispersing pigments Solids content: 60% | 8.3 (5.0) | 8.3 (5.0) |
| Pigment | Titanium oxide | 14.5 | 24.0 |
| | Refined clay | 7.0 | 10.0 |
| | Carbon black | 0.3 | 0.3 |
| | Bismuth hydroxide | 1.0 | 1.0 |
| | Dioctyltin oxide | 1.0 | 1.0 |
| Deionized water | | 27.3 | 40.5 |
| 55% Pigment dispersion paste | | 52.4 (28.8) | 75.1 (41.3) |
| Total amount of the pigment (parts) | | 22.8 | 35.3 |

Production Example 27

294 parts (solids content: 100 parts) of emulsion No. 1 obtained in Production Example 10, 52.4 parts (solids content: 28.8 parts) of 55% pigment dispersion paste No. 1 obtained in Production Example 25, and 297.6 parts of deionized water were added. Cationic electrodeposition coating composition No. 1 with a solids content of 20% was obtained.

Production Examples 28 to 37

Cationic electrodeposition coating compositions Nos. 2 to 11 were produced in the same manner as in Production Example 27, except that the formulations shown in Table 4 were used.

TABLE 4

| | | Production Example 27 | Production Example 28 | Production Example 29 | Production Example 30 | Production Example 31 | Production Example 32 | Production Example 33 | Production Example 34 | Production Example 35 | Production Example 36 | Production Example 37 |
|---|---|---|---|---|---|---|---|---|---|---|---|---|
| Cationic electrodeposition coating composition | | No. 1 | No. 2 | No. 3 | No. 4 | No. 5 | No. 6 | No. 7 | No. 8 | No. 9 | No. 10 | No. 11 |
| Formulation | Emulsion No. 1 | 294.0 (100) | | | | | | | | | | |
| | Emulsion No. 2 | | 294.0 (100) | | | | | | | | | |
| | Emulsion No. 3 | | | 294.0 (100) | | | | | | | | |
| | Emulsion No. 4 | | | | 294.0 (100) | | | | | | | |
| | Emulsion No. 5 | | | | | 294.0 (100) | | | | | | |
| | Emulsion No. 6 | | | | | | 294.0 (100) | | | | | |
| | Emulsion No. 7 | | | | | | | 294.0 (100) | | | | |
| | Emulsion No. 8 | | | | | | | | 294.0 (100) | | | |
| | Emulsion No. 9 | | | | | | | | | 294.0 (100) | | |
| | Emulsion No. 10 | | | | | | | | | | 294.0 (100) | |
| | Pigment dispersion Paste No. 1 | 52.4 (28.8) | 52.4 (28.8) | 52.4 (28.8) | 52.4 (28.8) | 52.4 (28.8) | 52.4 (28.8) | 52.4 (28.8) | 52.4 (28.8) | 52.4 (28.8) | 52.4 (28.8) | |
| | Pigment dispersion Paste No. 2 | | | | | | | | | | | 75.1 (41.3) |

TABLE 4-continued

| | | Production Example 27 | Production Example 28 | Production Example 29 | Production Example 30 | Production Example 31 | Production Example 32 | Production Example 33 | Production Example 34 | Production Example 35 | Production Example 36 | Production Example 37 |
|---|---|---|---|---|---|---|---|---|---|---|---|---|
| | Deionized water | 297.6 | 297.6 | 297.6 | 297.6 | 297.6 | 297.6 | 297.6 | 297.6 | 297.6 | 297.6 | 337.4 |
| Cationic electrodeposition coating composition Solids content: 20% | | 644.0 (128.8) | 644.0 (128.8) | 644.0 (128.8) | 644.0 (128.8) | 644.0 (128.8) | 644.0 (128.8) | 644.0 (128.8) | 644.0 (128.8) | 644.0 (128.8) | 644.0 (128.8) | 706.5 (141.3) |

The numerals denote the amount of the ingredient used, and the parenthesized numerals denote the solids content.

Comparative Production Examples 1 to 4

Cationic electrodeposition coating compositions Nos. 12 to 15 were produced in the same manner as in Production Example 27, except that the formulations shown in Table 5 were used.

TABLE 5

| | | Comparative Production Example 1 | Comparative Production Example 2 | Comparative Production Example 3 | Comparative Production Example 4 |
|---|---|---|---|---|---|
| Cationic electrodeposition coating composition | | No. 12 | No. 13 | No. 14 | No. 15 |
| Formulation | Emulsion No. 11 | 294.0 (100) | | | |
| | Emulsion No. 12 | | 294.0 (100) | | |
| | Emulsion No. 13 | | | 294.0 (100) | |
| | Emulsion No. 14 | | | | 294.0 (100) |
| | Pigment dispersion No. 1 | 52.4 (28.8) | 52.4 (28.8) | 52.4 (28.8) | 52.4 (28.8) |
| | Deionized water | 297.6 | 297.6 | 297.6 | 297.6 |
| Cationic electrodeposition coating composition Solids content: 20% | | 644.0 (128.8) | 644.0 (128.8) | 644.0 (128.8) | 644.0 (128.8) |

The numerals denote the amount of the ingredient used, and the parenthesized numerals denote the solids content.

Production of an Aqueous First Colored Coating Composition

Production Example 38

Production of Polyester Resin Solution (PE1)

a 4-necked flask equipped with a heater, a stirrer, a thermometer, a reflux condenser, and a rectification column was charged with 108 parts by mass of dodecanedioic acid, 102.8 parts by mass of adipic acid, 149.4 parts by mass of isophthalic acid, 180.4 parts by mass of hexahydroxyphthalic anhydride, 143.8 parts by mass of neopentylglycol, 219.1 parts by mass of butylethylpropanediol, and 160.2 parts by mass of trimethylolpropane. After the resulting mixture was heated to 160° C., the temperature was raised from 160° C. to 230° C. over a period of 3 hours, while distilling off the generated condensed water using a rectification column. Then, the reaction was allowed to proceed at 230° C. for 2 hours.

Subsequently, the rectification column was replaced with a water separator, and a suitable amount of toluene was added. The mixture was subjected to a condensation reaction under reflux at 230° C. while the generated condensed water was separated using the water separator and distilled off.

When the acid value of the resin became 2 mg KOH/g, toluene was removed under reduced pressure, and the resulting mixture was cooled to 170° C. After 31.5 parts by mass of trimellitic anhydride was added and an addition reaction was allowed to proceed at 170° C. for 60 minutes, 10 mass % of propylene glycol monomethyl ether was added to the reaction product. After adjusting the temperature to 85° C., the acid value was measured. The reaction product was neutralized with N,N-dimethylethanolamine in an amount corresponding to 0.9 equivalents relative to the acid value. Further, deionized water was gradually added to produce an aqueous dispersion. As a result, polyester resin solution (PE1) having a solids content of 48% was obtained. The polyester resin solids had a number average molecular weight of 1,430, a hydroxyl value of 133 mg KOH/g, and an acid value of 20.4 mg KOH/g.

Production Example 39

Production of First Aqueous Colored Coating Composition No. 1

While stirring 37.5 parts of a resin for pigment dispersion (Note 5), 1 part of Carbon MA100 (carbon black, manufactured by Mitsubishi Chemical Corp.), 70 parts of JR-806 (titanium white, manufactured by Tayca Corp.), and 10 parts of MICRO ACES S-3 (fine powder talc, manufactured by Nippon Talc Co., Ltd.) were sequentially added. The mixture was dispersed using a paint shaker for 30 minutes to obtain a pigment dispersion paste.

While stirring 118.5 parts of the obtained pigment dispersion paste, 114.6 parts (solids content: 55 parts) of polyester resin (PE1) obtained in Production Example 38, 37.5 parts (solids content: 30 parts) of melamine resin MF-1 (a methoxy/butoxy mixed alkylated melamine resin, solids content: 80%) and 7 parts of "n-butylalcohol" were sequentially added. Further, deionized water and dimethylethanolamine were added to obtain first aqueous colored coating composition No. 1 having a pH of 8.5, and a viscosity of 40 seconds as measured by Ford cup No. 4 at 20° C.

(Note 5) Resin for pigment dispersion: a resin for pigment dispersion with a solids content of 40%, obtained by reacting monomers consisting of "30.4 parts of Cardura E10P (manufactured by Hexion Specialty Chemicals), a glycidyl ester of synthetic highly branched saturated fatty acid, 41.5 parts of trimethylolpropane, 80.7 parts of anhydrous isophthalic acid, 79.9 parts of adipic acid, 83.0 parts of neopentylglycol, and 19.6 parts of trimellitic anhydride". The resin for pigment dispersion had an acid value of 40 mg KOH/g, a hydroxyl value of 108 mg KOH/g, and a number average molecular weight of 1,500.

Production Example 40

The procedure of Production Example 39 was repeated, except that "dipropylene glycol monobutyl ether" was used in place of "n-butyl alcohol" used in Production Example 39. As a result, first aqueous colored coating composition No. 2 was obtained.

Production Example 41

The procedure of Production Example 39 was repeated, except that "2-ethyl-1-hexanol" was used in place of "n-butyl alcohol" used in Production Example 39. As a result, first aqueous colored coating composition No. 3 was obtained.

Production Example 42

The procedure of Production Example 39 was repeated, except that "3-methoxybutyl acetate" was used in place of "n-butyl alcohol" used in Production Example 39. As a result, first aqueous colored coating composition No. 4 was obtained.

Production Example 43

The procedure of Production Example 39 was repeated, except that "diethylene glycol monoethyl ether" was used in place of "n-butyl alcohol" used in Production Example 39. As a result, first aqueous colored coating composition No. 5 was obtained.

Production of Aqueous Second Colored Coating Composition

Production Example 44

Production of Acrylic Resin Emulsion (AC)

A reaction vessel equipped with a thermometer, a thermostat, a stirrer, a reflux condenser, a nitrogen inlet tube, and a dropper was charged with 130 parts of deionized water and 0.52 parts of Aqualon KH-10 (Note 6), which were mixed by stirring under a stream of nitrogen, and the temperature was raised to 80° C.

Subsequently, 1% of the total amount of the monomer emulsion (1) explained below and 5.3 parts of a 6% ammonium persulfate aqueous solution were introduced into the reaction vessel, and the temperature was maintained at 80° C. for 15 minutes. The remaining monomer emulsion (1) was then added dropwise to the reaction vessel over a period of 3 hours, while maintaining the reaction vessel at the same temperature. After completion of the dropwise addition, the mixture was aged for 1 hour.

Subsequently, the monomer emulsion (2) explained below was added dropwise over a period of 1 hour, and the resulting mixture was aged for 1 hour. While 40 parts of a 5% aqueous dimethylethanolamine solution was gradually added dropwise to the reaction vessel, the mixture was cooled to 30° C. The mixture was filtered through a 100-mesh nylon cloth to obtain an acrylic resin emulsion (AC) having a solids content of 30%. The obtained acrylic resin had an acid value of 33 mg KOH/g and a hydroxyl value of 25 mg KOH/g.

(Note 6) Aqualon KH-10: a polyoxyethylene alkyl ether sulfate ester ammonium salt, manufactured by Dai-ichi Kogyo Seiyaku Co., Ltd., active ingredient: 97%.

Monomer emulsion (1): an emulsion of 42 parts of deionized water, 0.72 parts of Aqualon KH-10, 2.1 parts of methylene bisacrylamide, 2.8 parts of styrene, 16.1 parts of methyl methacrylate, 28 parts of ethyl acrylate, and 21 parts of n-butyl acrylate.

Monomer emulsion (2): an emulsion of 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate.

Production Example 45

Production of Polyester Resin Solution (PE2)

A reaction vessel equipped with a thermometer, a thermostat, a stirrer, a reflux condenser, and a water separator was charged with 109 parts of trimethylolpropane, 141 parts of 1,6-hexanediol, 126 parts of hexahydrophthalic anhydride, and 120 parts of adipic acid. After the temperature was raised from 160° C. to 230° C. over a period of 3 hours, the mixture was subjected to a condensation reaction at 230° C. for 4 hours. To add carboxyl groups to the condensation reaction product, 38.3 parts of trimellitic anhydride was added, and the mixture was reacted at 170° C. for 30 minutes. The reaction mixture was then diluted with 2-ethyl-1-hexanol to obtain a polyester resin solution (PE2) having a solids content of 70%. The obtained polyester resin had an acid value of 46 mg KOH/g, a hydroxyl value of 150 mg KOH/g, and a weight average molecular weight of 6,400.

Production Example 46

Production of Luster Pigment Dispersion 19 parts of an aluminium pigment paste (trade name "GX-180A", manufactured by Asahi Kasei Metals Limited, metal content: 74%), 35 parts of 2-ethyl-1-hexanol, 8 parts of a phosphoric acid group-containing resin solution (Note 7), and 0.2 parts of 2-(dimethylamino)ethanol were uniformly mixed in a stirring/mixing vessel. As a result, luster pigment dispersion (P1) was obtained.

(Note 7) Phosphoric acid group-containing resin solution: a phosphoric acid group-containing resin solution with a solids content of 50%, obtained by reacting 25 parts of styrene, 27.5 parts of n-butyl methacrylate, 20 parts of branched higher alkyl acrylate (trade name "Isostearyl acrylate", manufactured by Osaka Organic Chemical Industry, Ltd.), 7.5 parts of 4-hydroxybutyl acrylate, 15 parts of a phosphoric acid group-containing polymerizable monomer (Note 8), and 12.5 parts of 2-methacryloyloxyethyl acid phosphate. The phosphoric acid group-containing resin had an acid value, based on the phosphoric acid group, of 83 mg KOH/g, a hydroxyl value of 29 mg KOH/g, and a weight average molecular weight of 10,000.

(Note 8) Phosphoric acid group-containing polymerizable monomer: a phosphoric acid group-containing polymerizable monomer solution with a solids content of 50%, obtained by reacting 57.5 parts of monobutylphosphoric acid and 42.5 parts of glycidyl methacrylate.

Production Example 47

Production of Second Aqueous Colored Coating Composition No. 1

100 parts of acrylic resin emulsion (AC) obtained in Production Example 44, 57 parts of polyester resin solution (PE2) obtained in Production Example 54, 62 parts of luster pigment dispersion (P1) obtained in Production Example 55, and 37.5 parts of Cymel 325 (an imino group-containing methylated melamine resin, trade name, manufactured by Japan Cytec Industries, Inc., solids content: 80%) were uniformly mixed. Further, a polyacrylic acid thickener (trade name "Primal ASE-60", manufactured by Rohm & Haas Co.), 10 parts of 2-ethyl-1-hexanol, and deionized water were added to obtain second aqueous colored coating composition No. 1 having a pH of 8.0, a solids content of 25%, and a viscosity of 40 seconds as measured by Ford cup No. 4 at 20° C.

Production Example 48

The procedure of Production Example 47 was repeated, except that "diethylene glycol monoethyl ether" was used in place of "2-ethyl-1-hexanol" used in Production Example 47. As a result, second aqueous colored coating composition No. 2 was obtained.

Preparation of Clear Coating Composition

Production Example 49

20 parts of DBE (trade name, manufactured by Du Pont, Inc.) was added to a mixture of 73.6 parts (solids content) of an acrylic resin solution (Note 9), 26.4 parts (solids content) of Cymel 303 (trade name, a melamine resin, manufactured by Mitsui Cytec, Ltd.), 4 parts of a 25% dodecylbenzene-sulfonic acid solution, and 0.5 parts of BYK-300 (trade name, manufactured by BYK-Chemie Japan, KK) to adjust the viscosity to 30 seconds as measured by Ford cup No. 4 at 20° C. As a result, clear coating composition D1 was obtained.
(Note 9) Acrylic resin solution: an acrylic resin solution with a solids content of 70%, a hydroxyl value of 120, and a number average molecular weight of about 6,000, obtained by adding a mixture (Note 10) over a period of 3 hours to 40 parts of Swasol #1000 (trade name, an aromatic mixed solvent, manufactured by Maruzen Petroleum Co. Ltd.) heated to 120° C., and performing a copolymerization reaction.
(Note 10) Mixture: a mixture of 30 parts of styrene, 35 parts of butyl acrylate, 10 parts of 2-ethylhexyl methacrylate, 25 parts of 2-hydroxyethyl acrylate, and 4 parts of α,α'-azobi-sisobutyronitrile.

Examples and Comparative Examples

Example 1

Multilayer coating film No. 1 was formed by the following steps.
Step 1:
Cationic electrodeposition coating composition No. 1 was applied by electrodeposition to a cold-rolled steel plate (150 mm (length)×70 mm (width)×0.8 mm (thickness), center line mean roughness (Ra)=0.8, centre line average (Wca) in the filtered central line waviness curve=0.19) chemically treated with "Palbond #3020" (trade name, a zinc phosphate treating agent, manufactured by Nihon Parkerizing Co., Ltd.). The resulting coating was heated at 170° C. for 20 minutes to form a cured electrodeposition coating film having a thickness of 20 μm.
Step 2:
First colored aqueous coating composition No. 1 obtained in Production Example 39 was applied to the coated plate by electrostatic coating to a film thickness of 25 μm (when cured) using an electrostatic rotary atomizing coater. The resulting coating was allowed to stand for 2 minutes, and then preheated at 80° C. for 5 minutes.
Step 3:
Subsequently, second coloring aqueous coating composition No. 1 obtained in Production Example 47 was applied to the uncured first colored coating film by electrostatic coating to a film thickness of 15 μm (when cured) using an electrostatic rotary atomizing coater. The resulting coating was allowed to stand for 2 minutes, and then preheated at 80° C. for 5 minutes.
Step 4:
Clear coating composition D1 obtained in Production Example 49 was applied to the cured second colored aqueous coating film by electrostatic coating to a film thickness of 35 μm (when cured). The resulting coating was allowed to stand for 7 minutes.
Step 5:
Subsequently, heating was performed at 140° C. for 30 minutes to cure the first aqueous colored coating film, second aqueous colored coating film, and clear coating film.

Examples 2 to 11

The procedure of Example 1 was repeated, except that the steps were changed as shown in Tables 6 and 7. As a result, multilayer coating films Nos. 2 to 11 were obtained in Examples 2 to 11.

Examples 12 to 13

The procedure of Example 1 was repeated (the cured film thickness was also the same), except that the substrate was replaced with a cold-rolled steel plate (150 mm (length)×70 mm (width)×0.8 mm (thickness), a center line mean roughness (Ra)=1.3, a centre line average (Wca) in the filtered central line waviness curve=0.58) chemically treated with "Palbond #3020" (trade name, a zinc phosphate treating agent, manufactured by Nihon Parkerizing Co., Ltd.), and that the steps were changed as shown in Table 7. As a result, multilayer coating films Nos. 12 and 13 were obtained in Examples 12 to 13.
Tables 6 and 7 include the performance evaluation results of the multilayer coating films obtained in Examples 1 to 13.

TABLE 6

|  |  |  | | Example 1 | Example 2 | Example 3 | Example 4 | Example 5 | Example 6 | Example 7 |
|---|---|---|---|---|---|---|---|---|---|---|
| Multilayer coating film |  |  | | No. 1 | No. 2 | No. 3 | No. 4 | No. 5 | No. 6 | No. 7 |
| Steps | Step 1 | (Zinc phosphated) cold-rolled steel plate | Ra | 0.8 | 0.8 | 0.8 | 0.8 | 0.8 | 0.8 | 0.8 |
|  |  |  | Wca | 0.19 | 0.19 | 0.19 | 0.19 | 0.19 | 0.19 | 0.19 |
|  |  | Cationic electrodeposition coating composition | | No. 1 | No. 2 | No. 3 | No. 4 | No. 5 | No. 6 | No. 7 |
|  |  | Drying by heating | | 170° C. 20 min | 170° C. 20 min | 170° C. 20 min | 170° C. 20 min | 170° C. 20 min | 170° C. 20 min | 170° C. 20 min |
|  | Step 2 | First colored coating composition (B) | | No. 1 | No. 1 | No. 1 | No. 1 | No. 1 | No. 2 | No. 3 |
|  |  | Preheating (temperature/time) | | 80° C. 5 min | 80° C. 5 min | 80° C. 5 min | 80° C. 5 min | 80° C. 5 min | 80° C. 5 min | 80° C. 5 min |
|  | Step 3 | Second colored coating composition (C) | | No. 1 | No. 1 | No. 1 | No. 1 | No. 1 | No. 1 | No. 1 |
|  |  | Preheating (temperature/time) | | 80° C. 5 min | 80° C. 5 min | 80° C. 5 min | 80° C. 5 min | 80° C. 5 min | 80° C. 5 min | 80° C. 5 min |
|  | Step 4 | Clear coating composition (D) | | D1 | D1 | D1 | D1 | D1 | D1 | D1 |
|  | Step 5 | Drying by baking (temperature/time) | | 140° C. 30 min | 140° C. 30 min | 140° C. 30 min | 140° C. 30 min | 140° C. 30 min | 140° C. 30 min | 140° C. 30 min |
| Single-layer electrodeposition coating film | Surface roughness of the electrodeposition coating film (Note 11) | | Ra | ⊚ | ⊚ | ⊚ | ⊚ | ○ | ⊚ | ⊚ |
|  |  | | Wca | ⊚ | ⊚ | ⊚ | ⊚ | ○ | ⊚ | ⊚ |
|  | Solvent swelling ratio of the electrodeposition coating film (Note 12) | | | A | A | A | AA | AA | AA | A |
|  | Absorption rate of toluene (Note 13) | | | A | A | A | A | A | A | A |
| Multi-layer coating film | Finish of the multilayer coating film (Note 14) | | | ⊚ | ○ | ⊚ | ⊚ | ⊚ | ⊚ | ○ |
|  | Corrosion resistance (Note 15) | | | ⊚ | ⊚ | ⊚ | ⊚ | ⊚ | ○ | ○ |

TABLE 7

|  |  |  | | Example 8 | Example 9 | Example 10 | Example 11 | Example 12 | Example 13 |
|---|---|---|---|---|---|---|---|---|---|
| Multilayer coating film |  |  | | No. 8 | No. 9 | No. 10 | No. 11 | No. 12 | No. 13 |
| Steps | Step 1 | (Zinc phosphated) cold-rolled steel plate | Ra | 0.8 | 0.8 | 0.8 | 0.8 | 1.3 | 1.3 |
|  |  |  | Wca | 0.19 | 0.19 | 0.19 | 0.19 | 0.58 | 0.58 |
|  |  | Cationic electrodeposition coating composition | | No. 8 | No. 9 | No. 10 | No. 11 | No. 1 | No. 5 |
|  |  | Drying by heating | | 170° C. 20 min | 170° C. 20 min | 170° C. 20 min | 170° C. 20 min | 170° C. 20 min | 170° C. 20 min |
|  | Step 2 | First colored coating composition (B) | | No. 4 | No. 5 | No. 1 | No. 1 | No. 1 | No. 1 |
|  |  | Preheating (temperature/time) | | 80° C. 5 min | 80° C. 5 min | 80° C. 5 min | 80° C. 5 min | 80° C. 5 min | 80° C. 5 min |
|  | Step 3 | Second colored coating composition (C) | | No. 1 | No. 1 | No. 2 | No. 2 | No. 1 | No. 1 |
|  |  | Preheating (temperature/time) | | 80° C. 5 min | 80° C. 5 min | 80° C. 5 min | 80° C. 5 min | 80° C. 5 min | 80° C. 5 min |
|  | Step 4 | Clear coating composition (D) | | D1 | D1 | D1 | D1 | D1 | D1 |
|  | Step 5 | Drying by baking (temperature/time) | | 140° C. 30 min | 140° C. 30 min | 140° C. 30 min | 140° C. 30 min | 140° C. 30 min | 140° C. 30 min |
| Single-layer electrodeposition coating film | Surface roughness of the electrodeposition coating film (Note 11) | | Ra | ⊚ | ⊚ | ○ | ○ | ○ | ○ |
|  |  | | Wca | ⊚ | ⊚ | ○ | ○ | ○ | ○ |
|  | Solvent swelling ratio of the electrodeposition coating film (Note 12) | | | A | A | AA | AA | A | A |
|  | Absorption rate of toluene (Note 13) | | | A | A | A | A | A | A |
| Multilayer coating film | Finish of the multilayer coating film (Note 14) | | | ⊚ | ○ | ⊚ | ⊚ | ○ | ○ |
|  | Corrosion resistance (Note 15) | | | ⊚ | ⊚ | ⊚ | ⊚ | ⊚ | ⊚ |

Comparative Examples 1 to 4

Multilayer coating films Nos. 14 to 17 were produced in the same manner as in Example 1, except that the steps were changed as shown in Table 8. Table 8 includes the performance evaluation results of the multilayer coating films obtained in Comparative Examples 1 to 4.

TABLE 8

| | | | | Comparative Example 1 | Comparative Example 2 | Comparative Example 3 | Comparative Example 4 |
|---|---|---|---|---|---|---|---|
| Multilayer coating film | | | | No. 14 | No. 15 | No. 16 | No. 17 |
| Steps | Step 1 | (Zinc phosphated) cold-rolled steel plate | Ra | 0.8 | 0.8 | 0.8 | 0.8 |
| | | | Wca | 0.19 | 0.19 | 0.19 | 0.19 |
| | | Cationic electrodeposition coating composition | | No. 12 | No. 13 | No. 14 | No. 15 |
| | | Drying by heating | | 170° C. 20 min | 170° C. 20 min | 170° C. 20 min | 170° C. 20 min |
| | Step 2 | First colored coating composition (B) | | No. 1 | No. 1 | No. 1 | No. 1 |
| | | Preheating (temperature/time) | | 80° C. 5 min | 80° C. 5 min | 80° C. 5 min | 80° C. 5 min |
| | Step 3 | Second colored coating composition (C) | | No. 1 | No. 1 | No. 1 | No. 1 |
| | | Preheating (temperature/time) | | 80° C. 5 min | 80° C. 5 min | 80° C. 5 min | 80° C. 5 min |
| | Step 4 | Clear coating composition (D) | | D1 | D1 | D1 | D1 |
| | Step 5 | Drying by baking (temperature/time) | | 140° C. 30 min | 140° C. 30 min | 140° C. 30 min | 140° C. 30 min |
| Single-layer electrodeposition coating film | Surface roughness of the electrodeposition coating film (Note 11) | | Ra | ◉ | ◉ | ◉ | ◉ |
| | | | Wca | ◉ | ◉ | ◉ | ◉ |
| | Solvent swelling ratio of the electrodeposition coating film (Note 12) | | | B | B | C | C |
| | Absorption rate of toluene (Note 13) | | | A | A | B | B |
| Multilayer coating film | Finish of the multilayer coating film (Note 14) | | | Δ | Δ | X | X |
| | Corrosion resistance (Note 15) | | | Δ | Δ | Δ | Δ |

(Note 11) Surface roughness of the electrodeposition coating films:

The center line mean roughness (Ra) of the electrodeposition coating films obtained in Step 1 of Examples 1 to 13 and Comparative Examples 1 to 4 was measured according to JIS B 0601 (definition and indication of the surface roughness, 1982) using Surfcom 301 (trade name, a surface roughness measuring instrument, manufactured by Mitutoyo Corporation), and the centre line average (Wca) in the filtered central line waviness curve of the electrodeposition coating films was determined according to JIS B 0610 (surface waviness, 1976) using Surfcom 301 (trade name, a surface roughness measuring instrument, manufactured by Mitutoyo Corporation). The Ra and Wca values of the (zinc phosphate-treated) cold-rolled steel plate were also determined in the same manner as above.

The "center line mean roughness (Ra)" of each electrodeposition coating film was evaluated according to the following criteria:
◉: The Ra value was less than 0.20.
○: The Ra value was 0.20 or more, and less than 0.50.
Δ: The Ra value was 0.50 or more, and less than 0.70.
X: The Ra value was more than 0.70.

The "centre line average in the filtered central line waviness curve (Wca)" of each electrodeposition coating film was evaluated according to the following criteria:
◉: The Wca value was less than 0.10.
○: The Wca value was 0.10 or more, and less than 0.50.
Δ: The Wca value was 0.50 or more, and less than 0.70.
X: The Wca value was more than 0.70.

(Note 12) Solvent swelling ratio of the electrodeposition coating film:

Using tin plates whose mass was measured beforehand as substrates, each electrodeposition coating composition was applied to 5 tin plates by electrodeposition coating to a film thickness of 20 μm (when dried), and baked at 170° C. for 20 minutes to prepare test plates (5 plates per organic solvent). The test plates were allowed to cool, and then immersed in 80° C. organic solvents selected from n-butyl alcohol, dipropylene glycol monobutyl ether, 2-ethyl-1-hexanol, 3-methoxybutyl acetate, and diethylene glycol monoethyl ether for 10 minutes.

After the test plates were withdrawn from the solvents, the organic solvent adhering to the surface of each plate was wiped off, and each test plate was allowed to stand at room temperature for 1 minute. Thereafter, the mass of the plate was measured to calculate "the mass of the coating film obtained by subtracting the mass of the tin plate" . . . (i).

The test plates used for calculating "the mass of the coating film obtained by subtracting the mass of the tin plate" were dried at 140° C. for 30 minutes to determine "the mass of the coating film obtained by subtracting the mass of the tin plate and vaporizing the organic solvent" . . . (ii). The mass (ii) is a mass of the coating film from which the organic solvent-soluble substances have been removed.

The solvent swelling ratio (%) was obtained according to the following Formula (10):

$$((i)-(ii))/(ii)) \times 100 (\%) \qquad \text{Formula (10)}$$

The solvent swelling ratio (%) was evaluated according to the following criteria:
AA: The solvent swelling ratio (%) was 25 mass % or less, regardless of the type of organic solvent used.
A: The solvent swelling ratio (%) was 30 mass % or less, regardless of the type of organic solvent used; a solvent swelling ratio of more than 25 mass % and not more than 30 mass % was observed in at least one of the organic solvents.
B: The solvent swelling ratio (%) was 35 mass % or less, regardless of the type of organic solvent used; a solvent swelling ratio of more than 30 mass %, and not more than 35 mass % was observed in at least one of the organic solvents.
C: A solvent swelling ratio of more than 35 mass % was observed in at least one of the organic solvents.
(Note 13) Absorption rate of toluene: The absorption rate of toluene was calculated according to Formula (11) shown below. Using tin plates whose mass was measured beforehand as substrates, each electrodeposition coating composition was applied by electrodeposition coating to a film thickness of 20 μm (when dried), and baked at 170° C. for 20 minutes.

After each test plate was allowed to cool, "the mass of the coating film obtained by subtracting the mass of the tin plate . . . (iii)" was determined.

Subsequently, each test plate was immersed in toluene at room temperature for 1 week, and then withdrawn from the solvent. Toluene adhering to the surface was wiped off, and the test plate was allowed to stand at room temperature (20° C., windless state) for 1 minute, and then "the mass of the coating film obtained by subtracting the mass of the tin plate" . . . (iv) was determined.

$$((iv)-(iii))/(iii))\times 100 (\%) \quad \text{Formula (11)}$$

The absorption rate of toluene was evaluated according to the following criteria:
A: The absorption rate of toluene was 15% or less.
B: The absorption rate of toluene was more than 15%, and not more than 20%.
C: The absorption rate of toluene was more than 20%.
(Note 14) Finish of the multilayer coating film:

The Wb value of each of the multilayer coating films obtained in Steps 1 to 5 of Examples 1 to 13 and Comparative Examples 1 to 4 was measured using "Wave Scan DOI" (trade name, manufactured by BYK Gardner) to evaluate the multilayer coating films based on the Wb values. The smaller the measured value, the smoother the coating surface.
A: The Wb value was less than 15.
B: The Wb value was 15 or more, and less than 20.
C: The Wb value was 20 or more, and less than 25.
D: The Wb value was more than 25.
(Note 15) Corrosion resistance:

Crosscuts reaching the substrates were made with a knife in the electrodeposition coating films obtained in step 1 of Examples 1 to 13 and Comparative Examples 1 to 4. Each test plate was then subjected to a salt spray test for 840 hours according to JIS Z-2371, after which the corrosion resistance was evaluated, based on the width of rust or blister developed in the cut portion according to the following criteria.
◉: The maximum width of rust or blister on one side of the cut was less than 1.5 mm.
○: The maximum width of rust or blister on one side of the cut was not less than 1.5 mm, and less than 2.5 mm.
Δ: The maximum width of rust or blister on one side of the cut was not less than 2.5 mm, and less than 3.0 mm.
X: The maximum width of rust or blister on one side of the cut was not less than 3.5 mm.

INDUSTRIAL APPLICABILITY

The present invention provides a coated product having a multilayer coating film with excellent finish by a 3-coat 1-bake method, wherein a first colored aqueous coating composition, a second colored aqueous coating composition, and a clear coating composition are applied to an electrodeposition coating film.

The invention claimed is:
1. A method for forming a coating film comprising the steps of:
forming a cured coating film (A1) of a cationic electrodeposition coating composition (A) on a metal object to be coated;
forming a first colored coated film (B1) by coating a first colored aqueous coating composition (B) on the cured coating film (A1);
forming a second colored coated film (C1) by coating a second colored aqueous coating composition (C) on the uncured first colored coated film (B1);
forming a clear coated film (D1) by coating a clear coating composition (D) on the uncured second colored coated film (C1); and
simultaneously curing the uncured first colored coated film (B1), the uncured second colored coated film (C1), and the uncured clear coated film (D1),
wherein the cured coating film (A1) comprising the cationic electrodeposition coating composition (A) has:
(i) a center line mean roughness (Ra) of not greater than 0.50 μm in a roughness curve at a cutoff value of 2.5 mm;
(ii) a centre line average (Wca) of not greater than 0.50 μm in a filtered central line waviness curve at a high-band cutoff value of 0.8 mm and a low-band cutoff value of 8 mm; and
(iii) a solvent swelling ratio of not greater than 30.0 mass % after being immersed in an organic solvent selected from the group consisting of n-butyl alcohol, dipropylene glycol monobutyl ether, 2-ethyl-1-hexanol, 3-methoxybutyl acetate and diethylene glycol monoethyl ether at 80° C. for 10 minutes,
wherein the cationic electrodeposition coating composition (A) comprises an amino group-containing modified epoxy resin (a1) modified with a xylene formaldehyde resin that is obtained by reacting an epoxy resin (a11) having an epoxy equivalent of 180 to 2,500, a phenolic hydroxyl group-containing xylene formaldehyde resin (a12), and an amino group-containing compound (a13).
2. The method for forming a coating film according to claim 1, wherein the cationic electrodeposition coating composition (A) further comprises, in addition to the amino group-containing modified epoxy resin (a1), an amino group-containing modified epoxy resin (a2),
wherein the amino group-containing modified epoxy resin (a2) is obtained by reacting an amino group-containing compound (a24) with a modified epoxy resin (I) that is obtained by a reaction of a diepoxy compound (a21), which is compound (a211) represented by formula (1) below or compound (a212) represented by formula (2) below, an epoxy resin (a22) having an epoxy equivalent of 170 to 500, and a bisphenol compound (a23),

Formula (1)

$$CH_2-CH-CH_2+O-CH-CH_2\underset{m}{)}-O-\underset{R^2}{\underset{|}{\overset{R^2}{\underset{|}{C}}}}-\text{\textlangle}\text{\textrangle}-O+CH_2-CH-O\underset{n}{)}-CH_2-CH-CH_2$$
$$\underset{O}{\diagdown\diagup}\quad\quad R^1\quad\quad\quad\quad\quad\quad R^2\quad\quad\quad\quad R^1\quad\quad\underset{O}{\diagdown\diagup}$$

wherein each $R^1$ may be the same or different and each represents a hydrogen atom or a $C_{1-6}$ alkyl group, $R^2$ may be the same or different and each represents a hydrogen atom or a $C_{1-2}$ alkyl group, and m and n, which represent the number of repeat units of the portion having an alkylene oxide structure, are integers where m+n=1 to 20,

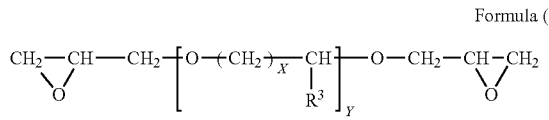

Formula (2)

wherein each $R^3$ may be the same or different, and each represents a hydrogen atom or a $C_{1-6}$ alkyl group, X is an integer of 1 to 9, Y is an integer of 1 to 50, and when Y is not less than 2, each $R^3$ in the repeating unit may be the same or different.

3. The method for forming a coating film according to claim 1, wherein the cationic electrodeposition coating composition (A) comprises 30 to 60 parts by mass of an amino group-containing modified epoxy resin (a1), 5 to 30 parts by mass of an amino group-containing modified epoxy resin (a2), and 10 to 40 parts by mass of a blocked polyisocyanate curing agent (b) relative to 100 parts by mass of a total solids components of (a1), (a2) and (b).

4. The method for forming a coating film according to claim 1, wherein an isocyanate compound contained in the blocked polyisocyanate curing agent (b) is an alicyclic polyisocyanate compound and/or an aromatic polyisocyanate compound having an aromatic ring.

5. The method for forming a coating film according to claim 1, wherein the first colored aqueous coating composition (B) is a coating composition that contains 1 to 150 parts by mass of a polar organic solvent having no more than 11 carbon atoms relative to 100 parts by mass of a total of base resin and cross-linking agent.

6. The method for forming a coating film according to claim 1, wherein the second colored aqueous coating composition (C) contains 1 to 150 parts by mass of a polar organic solvent having no more than 11 carbon atoms relative to 100 parts by mass of a total of base resin and cross-linking agent.

7. A coated article obtained by the method defined by claim 1.

* * * * *